United States Patent
Kvernvik et al.

(10) Patent No.: US 12,185,202 B2
(45) Date of Patent: *Dec. 31, 2024

(54) DEVICES AND METHODS FOR INDICATING AN EXTERNAL FACTOR ON THE HULL OF A BOAT

(71) Applicant: Telefonaktiebolaget LM Ericsson (publ), Stockholm (SE)

(72) Inventors: Tor Kvernvik, Täby (SE); Hjalmar Olsson, Bromma (SE); Nicolas Seyvet, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,341

(22) Filed: Jul. 5, 2023

(65) Prior Publication Data

US 2024/0007830 A1     Jan. 4, 2024

Related U.S. Application Data

(63) Continuation of application No. 16/471,441, filed as application No. PCT/SE2016/051300 on Dec. 21, 2016, now Pat. No. 11,736,914.

(51) Int. Cl.
*H04W 4/38*     (2018.01)
*B63B 79/10*     (2020.01)
(Continued)

(52) U.S. Cl.
CPC ............... *H04W 4/38* (2018.02); *B63B 79/10* (2020.01); *B63B 79/20* (2020.01); *H04W 4/027* (2013.01); *H04W 4/40* (2018.02)

(58) Field of Classification Search
None
See application file for complete search history.

(56) References Cited

U.S. PATENT DOCUMENTS

| | | | |
|---|---|---|---|
| 2010/0006018 A1* | 1/2010 | Lathem | B63B 59/045 114/361 |
| 2011/0259440 A1* | 10/2011 | Kawashima | B63B 1/38 137/234.6 |

(Continued)

FOREIGN PATENT DOCUMENTS

| | | |
|---|---|---|
| EP | 2 993 116 | 3/2016 |
| KR | 10-2016-0133248 | 11/2016 |

(Continued)

OTHER PUBLICATIONS

International Search Report and Written Opinion dated Oct. 3, 2017 issued in International Application No. PCT/SE2016/051300. (20 pages).

(Continued)

*Primary Examiner* — Adolf Dsouza
(74) *Attorney, Agent, or Firm* — Rothwell, Figg, Ernst & Manbeck, P.C.

(57) ABSTRACT

A method performed by a first communication device operating in a wireless communications network. The first communication device obtains a first set of one or more values indicating an observed speed of a boat relative to a power of an engine of the boat. The speed and the first indication are obtained by from sensors in the boat. The first communication device then obtains a second indication of an external factor on the hull of the boat causing friction against water. The obtaining of the second indication is based at least on: the obtained first set, and a reference. The reference is based on one of: a) a threshold, and b) a mathematical model. The first communication device also initiates providing a third indication of the external factor to a device, based on the obtained second indication.

23 Claims, 11 Drawing Sheets

(51) Int. Cl.
B63B 79/20 (2020.01)
H04W 4/02 (2018.01)
H04W 4/40 (2018.01)

(56) References Cited

U.S. PATENT DOCUMENTS

| | | | |
|---|---|---|---|
| 2012/0004357 A1* | 1/2012 | Roulleaux | C09D 5/1656 524/451 |
| 2012/0006352 A1 | 1/2012 | Holappa et al. | |
| 2012/0097088 A1 | 4/2012 | Guerrier | |
| 2014/0030118 A1* | 1/2014 | Costas | B63B 1/38 417/151 |
| 2019/0097088 A1 | 3/2019 | Huppmann et al. | |

FOREIGN PATENT DOCUMENTS

| | | |
|---|---|---|
| WO | 2006/136157 | 12/2006 |
| WO | 2010/031399 | 3/2010 |
| WO | 2014/043411 | 3/2014 |
| WO | 2017/089643 | 6/2017 |
| WO | 2017/089644 | 6/2017 |
| WO | 2017163110 | 9/2017 |

OTHER PUBLICATIONS

John Carlton; Chapter 24: Service performance and analysis; Marine propellers and propulsion, third edition; Butterworth-Heinemann; ISBN 978-0-08-097123-0; ISBN 0-08-097123-7; Published: Nov. 30, 2012; pp. 479-480, 482-483, 492-494, 496-499, 501; figures 24.17,24.24; Sections 24.2; 24.5; and 24.6. Table 24.8. (25 pages).
Guo J Y; Chin CS; Clare AS; Ma Maode; Interactive vision-based intelligent system for active macfouling and microfouling detection on hull; Conference Proceedings Article; Oceans 2016—Shanghai; Published: Apr. 10, 2016; abstract; Chapter I. Introduction. (8 pages).
Sea Tulip Warning—Archipelago Foundation, "Barnacle Warning", https://skargardsstiftelsen.se/naturvard-och-miljoovervakning/havstulpanvarning/, (Jun. 2019). (5 pages).
Supplementary European Search Report dated Nov. 27, 2019, issued in European Application No. 16 92 4833 (7 pages).

* cited by examiner

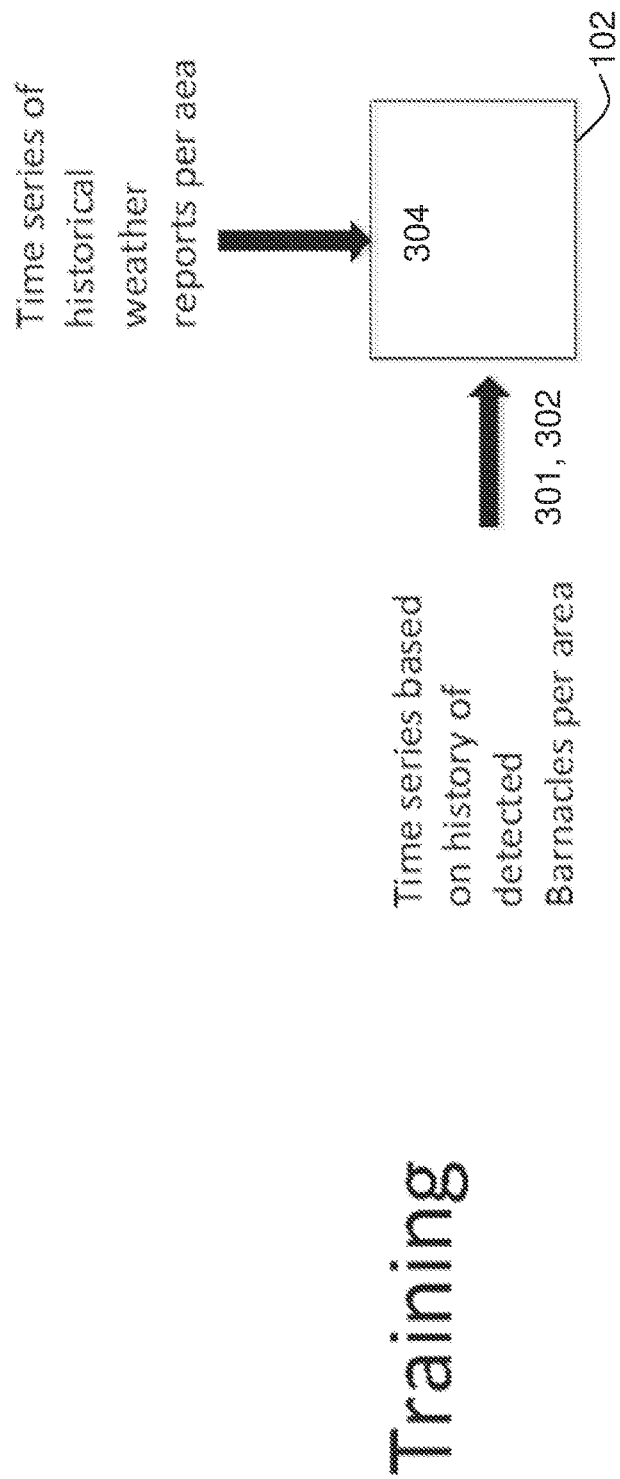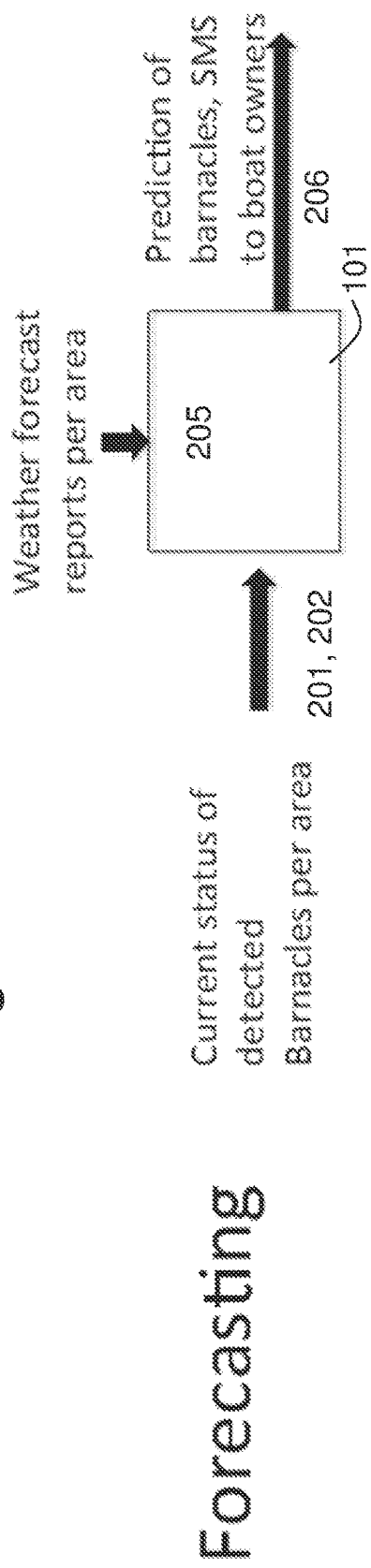
Figure 8
Figure 9

DEVICES AND METHODS FOR INDICATING AN EXTERNAL FACTOR ON THE HULL OF A BOAT

CROSS-REFERENCE TO RELATED APPLICATIONS

This application is a continuation of Ser. No. 16/471,441, filed on Jun. 19, 2019 (now U.S. Pat. No. 11,736,914, issued on Aug. 22, 2023), which is the National Stage of International Patent Application No. PCT/SE2016/051300, filed Dec. 21, 2016. The above identified applications are incorporated by this reference.

TECHNICAL FIELD

The present disclosure relates generally to a first communication device and methods performed thereby for initiating providing an indication of an external factor on the hull of a boat. The present disclosure also relates generally to a second communication device, and methods performed thereby, for facilitating providing the indication of the external factor on the hull of the boat. The present disclosure also relates generally to a device, and methods performed thereby, for receiving the indication of the external factor on the hull of a boat. The present disclosure further relates generally to a computer program product, comprising instructions to carry out the actions described herein, as performed by the first communication device, the second communication device, or the device. The computer program product may be stored on a computer-readable storage medium.

BACKGROUND

Communication devices within a wireless communications network may be e.g., stations (STAs), User Equipments (UEs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g. between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Communication devices may also be network nodes, or Access Points (AP). The wireless communications network covers a geographical area which may be divided into cell areas, each cell area being served by an access node such as a Base Station (BS), e.g. a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams.

In the context of this disclosure, the expression Downlink (DL) is used for the transmission path from the base station to the wireless device. The expression Uplink (UL) is used for the transmission path in the opposite direction i.e., from the wireless device to the base station.

Internet of Things (IoT)

The Internet of Things (IoT) may be understood as an internetworking of communication devices, e.g., physical devices, vehicles, which may also referred to as "connected devices" and "smart devices", buildings and other items-embedded with electronics, software, sensors, actuators, and network connectivity that may enable these objects to collect and exchange data. The IoT may allow objects to be sensed and/or controlled remotely across an existing network infrastructure.

"Things," in the IoT sense, may refer to a wide variety of devices such as heart monitoring implants, biochip transponders on farm animals, automobiles with built-in sensors, home automation devices such as the control and automation of lighting, heating, e.g. a "smart" thermostat, ventilation, air conditioning, and appliances such as washer, dryers, ovens, refrigerators or freezers that may use Wi-Fi for remote monitoring. These devices may collect data with the help of various existing technologies and then autonomously flow the data between other devices.

Machine Type Communication (MTC) has in recent years, especially in the context of the Internet of Things (IoT), shown to be a growing market segment for cellular technologies. An MTC device may be a communication device, typically a wireless communication device or simply wireless device, that is a self and/or automatically controlled unattended machine and that is typically not associated with an active human user in order to generate data traffic. A MTC device is typically more simple, and typically associated with a more specific application or purpose, than and in contrast to a conventional mobile phone or smart phone. MTC involves communication in a wireless communication network to and/or from MTC devices, which communication typically is of quite different nature and with other requirements than communication associated with e.g. conventional mobile phones and smart phones.

The Growing Problem of Boats

Boats at sea or in fresh water face a common, growing problem. A number of factors that are external to the boat, e.g., organisms such as barnacles, mussels or clams, can attach to the hull of a boat, and increase its friction against the water, triggering a chain of environmental, health and financial issues. This is a worldwide problem, see for example, www.economist.com/node/21527029.

Taking barnacles as an illustrative example, the drag imposed by a heavy infestation of barnacles on a boat may increase the consumption of fuel by a boat as much as 40%. This is a first environmental and financial problem.

To make matters worse, removing the barnacles is not only hard and expensive, but is also toxic. The approach usually used to remove the barnacles is copper poisoning in the form of copper-laced paint. Another chemical which may be used is tri-butyl tin. However, the paint placed on the hull of the boat releases toxic heavy metals into the water, and is therefore detrimental for the environment, as well as for the people applying the paint on the boat. In some countries such as Sweden, usage of toxic chemicals in the paint is prohibited by law. Ongoing research to identify less toxic alternatives has so far been unsuccessful.

There is also a limited time window to easily remove barnacles. If they are not removed within 1-2 weeks, they will be much harder to remove. For example, in Sweden, there are a number automatic washing machines that may be used if the barnacles are detected early, see for example http://batmiljo.se/hitta-karta/. Therefore, quick detection of barnacles getting stuck on the bottom of the boat is important. This may not be an option to all boat users, since they not all may use the boat often enough to be able to detect the barnacle problem early enough. People using their own boat frequently may be able to discover speed reductions caused by barnacles. However, those not using their boat often or those using a rental boat may not be able to notice a change in drag.

Today, detecting infestation by barnacles is performed manually in a few specific locations. In Sweden, metallic plates are checked on a daily basis. They are used to measure barnacle build up. When barnacles are found on a plate, a public warning is issued to all boats. In Sweden, a subscription based warning system sends an SMS or an e-mail to all subscribers in the region. See for example http://skargardsstiftelsen.se/naturvard/havstulpanvarningar/.

Even better than an early detection of barnacles may be the ability to predict its presence. The diffusion of barnacles is hard to predict as it is based on multiple conditions like weather, time of year, water temperature, wind direction, streams, salinity, etc. For example, the saltier the water, the more barnacles.

Existing detection systems are based on manual detection by checking metal plates in a few locations. This is costly and gives a less detailed prediction of the geographical distribution of barnacles, as the situation may differ between harbors closely located. The subscription based information system represents a logistics problem, as it requires many manual operations. Furthermore, existing methods are not able to predict in advance when the barnacles will hit a certain area.

According to the foregoing, the difficulties with the existing methods to manage the existence of external factors on the hull of boats make these external factors a growing problem at an environmental, health, financial, and logistic level.

SUMMARY

It is an object of embodiments herein to improve the handling of an external factor on a hull of a boat, the external factor causing friction against the water.

According to a first aspect of embodiments herein, the object is achieved by a method performed by a first communication device. The first communication device operates in a wireless communications network. The first communication device obtains, for a boat, and for each of a first number of time periods, a first set of one or more values indicating an observed speed of the boat in water. The speed in water is relative to a first indication of a power of an engine of the boat. The power is used to provide the speed. The speed of the boat and the first indication of the power of the engine over the first number of time periods are obtained by the first communication device from two or more sensors in the boat, over the wireless communications network. The first communication device obtains the second indication of the external factor on the hull of the boat. The external factor causes friction against the water. The obtaining of the second indication is based at least on: i) the obtained first set of one or more values, and ii) a reference of the external factor. The reference is based on one of: a) a threshold indicating an expected speed of the boat in the water relative to the first indication of the power of the engine of the boat for a set of conditions, and b) a mathematical model. The first communication device then initiates providing a third indication of the external factor on the hull of the boat to a device connected to the wireless communications network, based on the obtained second indication.

According to a second aspect of embodiments herein, the object is achieved by a method performed by a second communication device. The method is for facilitating handling content in an ICN. The second communication device operates in the wireless communications network. The second communication device obtains, for the boat, and for each of a plurality of time periods, the first set of one or more values indicating the observed speed of the boat in the water relative to the first indication. The first indication is of the power of the engine of the boat. The power is used to provide the speed. The speed of the boat and the first indication of the power of the engine over each of the plurality of time periods are obtained by the second communication device from the two or more sensors in the boat, over the wireless communications network. The second communication device obtains, during the plurality of time periods, data on an existence of the external factor on the hull of the boat. The external factor causes friction against the water. The second communication device also determines a mathematical model of the existence of the external factor on the hull of the boat causing friction against the water. The mathematical model is based on the obtained first set of the one or more values for each of the plurality of time periods and the obtained data. The second communication device then facilitates providing the third indication of the external factor on the hull of one of: a) the boat, and b) another boat, to one of: the device connected to the wireless communications network, and the first communication device operating in the wireless communications network. The third indication is based on the determined mathematical model.

According to a third aspect of embodiments herein, the object is achieved by a method performed by a device. The device operates in the wireless communications network. The device receives, from the first communication device operating in the wireless communications network, the third indication. The third indication is of the external factor on the hull of a boat. The external factor causes friction against the water. The third indication is based at least on: i) for each of a first number of time periods, the first set of one or more values indicating the observed speed of the boat in water relative to the first indication of the power of the engine of the boat; the power is used to provide the speed; the speed of the boat and the first indication of the power of the engine over the first number of time periods are obtained from the two or more sensors in the boat, over the wireless communications network, and ii) the reference of the external factor. The reference is based on one of: a) the threshold indicating the expected speed of the boat in the water relative to the first indication of the power of the engine of the boat for the set of conditions, and b) the mathematical model. The device also provides, on an interface of the device, a fourth indication based on the received third indication.

According to a fourth aspect of embodiments herein, the object is achieved by the first communication device configured to operate in the wireless communications network. The first communication device is further configured to obtain, for the boat, and for each of the first number of time periods, the first set of the one or more values configured to indicate the observed speed of the boat in water relative to the first indication of the power of the engine of the boat. The power is configured to be used to provide the speed. The speed of the boat and the first indication of the power of the engine over the first number of time periods are configured to be obtained by the first communication device from two or more sensors in the boat, over the wireless communications network. The first communication device is further configured to obtain the second indication of the external factor on the hull of the boat. The external factor causes friction against the water. To obtain the second indication is configured to be based at least on: i) the first set of the one or more values configured to be obtained, and ii) the reference of the external factor. The reference is based on one of: a) the threshold configured to indicate the expected speed of the boat in the water relative to the first indication of the power of the engine of the boat for the set of conditions, and b) the mathematical model. The first communication device is further configured to initiate providing the third indication of the external factor on the hull of the boat to the device. The device is configured to be connected to the wireless communications network, based on the second indication configured to be obtained.

According to a fifth aspect of embodiments herein, the object is achieved by a second communication device. The second communication device is configured to operate in the wireless communications network. The second communication device is further configured to obtain, for the boat, and for each of the plurality of time periods, the first set of the one or more values configured to indicate the observed speed of the boat in the water relative to the first indication of the power of the engine of the boat. The power is configured to be used to provide the speed. The speed of the boat and the first indication of the power of the engine over each of the plurality of time periods are configured to be obtained by the second communication device from two or more sensors in the boat, over the wireless communications network. The second communication device is further configured to obtain, during the plurality of time periods, the data on the existence of the external factor on the hull of the boat, the external factor causing friction against the water. The second communication device is further configured to determine the mathematical model of the existence of the external factor on the hull of the boat. The external factor causes friction against the water. The mathematical model is configured to be based on the first set of the one or more values configured to be obtained for each of the plurality of time periods and the data configured to be obtained. The second communication device is also configured to facilitate providing the third indication of the external factor on the hull of one of: a) the boat, and b) the another boat, to one of: the device connected to the wireless communications network, and the first communication device configured to operate in the wireless communications network. The third indication is configured to be based on the mathematical model configured to be determined.

According to a sixth aspect of embodiments herein, the object is achieved by the device configured to be connected to a wireless communications network. The device is further configured to receive, from the first communication device configured to operate in the wireless communications network, the third indication. The third indication is of the external factor on the hull of a boat. The external factor causes friction against the water. The third indication is configured to be based at least on: i) for each of the first number of time periods, the first set of the one or more values configured to indicate the observed speed of the boat in the water relative to the first indication of the power of the engine of the boat; the power is used to provide the speed; the speed of the boat and the first indication of the power of the engine over the first number of time periods are configured to be obtained from two or more sensors in the boat, over the wireless communications network, and ii) the reference of the external factor. The reference is based on one of: a) the threshold configured to indicate the expected speed of the boat in the water relative to the first indication of the power of the engine of the boat for the set of conditions, and b) the mathematical model. The device is also configured to provide, on the interface of the device, the fourth indication based on the third indication configured to be received.

According to a seventh aspect of embodiments herein, the object is achieved by a computer program. The computer program comprises instructions which, when executed on at least one processor, cause the at least one processor to carry out the method performed by the first communication device According to an eighth aspect of embodiments herein, the object is achieved by computer-readable storage medium. The computer-readable storage medium has stored thereon a computer program comprising instructions which, when executed on at least one processor, cause the at least one processor to carry out the method performed by the first communication device.

According to a ninth aspect of embodiments herein, the object is achieved by a computer program. The computer program comprises instructions which, when executed on at least one processor, cause the at least one processor to carry out the method performed by the second communication device.

According to a tenth aspect of embodiments herein, the object is achieved by computer-readable storage medium. The computer-readable storage medium has stored thereon a computer program comprising instructions which, when executed on at least one processor, cause the at least one processor to carry out the method performed by the second communication device.

According to an eleventh aspect of embodiments herein, the object is achieved by a computer program. The computer program comprises instructions which, when executed on at least one processor, cause the at least one processor to carry out the method performed by the device.

According to a twelfth aspect of embodiments herein, the object is achieved by a computer program. The computer program comprises instructions which, when executed on at least one processor, cause the at least one processor to carry out the method performed by the device.

By the first communication device obtaining the second indication of the external factor on the hull of the boat causing friction against the water, and the first communication device initiating providing the third indication of the external factor on the hull of the boat to the device, based on the second indication, boat owners may be notified of the existence of the external factor at a current or at a future time point. Moreover, the first communication device itself, or the boat owners, may initiate removal of the external factor from the hull of their boat. This has advantages of the environment, as the boats use less polluting fuel. Moreover, usage of toxic paints is prevented. Furthermore, costs on fuel and monitoring and removal of the external factor are reduced.

By the second communication device determining the mathematical model, the existence of the external factor may be determined at a current time point, or predicted for a future time point. Furthermore, the second communication device facilitates the provision of the third indication to the device, allowing notification of boat owners of the existence of the external factor at a current or at a future time point.

BRIEF DESCRIPTION OF THE DRAWINGS

Examples of embodiments herein are described in more detail with reference to the accompanying drawings, and according to the following description.

FIG. 8 is a flowchart depicting embodiments of a method in a second communication device, according to embodiments herein.

FIG. 9 is a flowchart depicting embodiments of a method in a first communication device or a second communication device, according to embodiments herein.

DETAILED DESCRIPTION

In order to address the problems of existing methods, several embodiments are comprised herein. Embodiments herein may be understood to address the problems created by the existence of external factors on the hull of boats in the water. Particular embodiments herein may be understood to relate to an automated method and system for detecting the external factors, e.g., barnacles adhered to the hull of a boat, at sea. This may enable to detect when the external factors are starting to infest a particular area in order to send a notice to e.g., all boat owners in the area, as well as the environmental agencies.

Further particular embodiments herein may use information from a few boats equipped with sensors to detect when the external factors correspond to an infestation in an area. Together with geographical positions of the boats and other inputs, e.g., from weather reports, a model may be generated that may be used to detect when an infestation is starting, and forecast which areas are next to be infested.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

The terminology used in this disclosure to exemplify the embodiments herein should not be seen as limiting the scope of the embodiments herein to any particular technology system. Other wireless systems may also benefit from exploiting the ideas covered within this disclosure.

Figure 1:
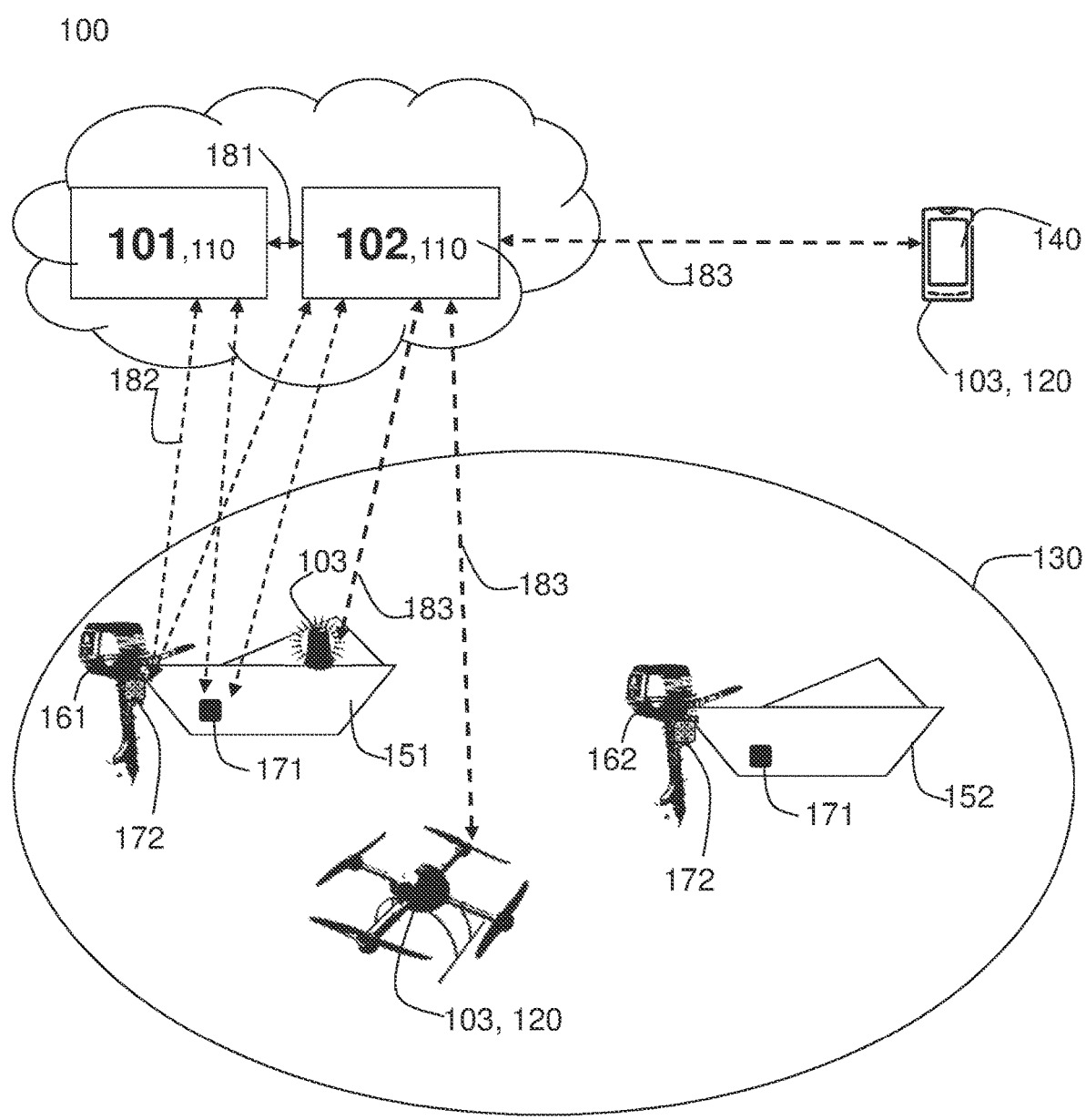
FIG. 1 is a schematic diagram illustrating embodiments of a wireless communications network, according to embodiments herein.

FIG. 1 depicts an example of a wireless communications network 100, sometimes also referred to as a cellular radio system, cellular network or wireless communications system, in which embodiments herein may be implemented. The wireless communications network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi or Wireless Local Area Network (WLAN) network, IoT network, NB-IoT network, ZigBee network, Bluetooth network, Xbee network, a GSM based communication network supporting EC-GSM, Worldwide Interoperability for Microwave Access (WiMax), Code division multiple access 2000 (CDMA2000), 5G system or any cellular network or system. Thus, although terminology from 3GPP LTE may be used in this disclosure to exemplify embodiments herein, this should not be seen as limiting the scope of the embodiments herein to only the aforementioned system. It should also be understood that the wireless communications network 100 may comprise wireless as well as wired communications.

The wireless communications network 100 comprises a plurality of communication devices, such as a first communication device 101, and a second communication device 102. The wireless communications network 100 also comprises a device 103. Any of the first communication device 101, the second communication device 102, and the device 103 may be a network node such as network node 110 described below, or a wireless device such as wireless device 120 described below. In some embodiments, the device 103 may also be a non-wireless device connected to the wireless communications network 100, that is, in communication with the wireless communications network 100 via a wired link or a wireless link. The device 103 may for example have a different operator than any of the first communication device 101 and the second communication device 103. For example, the device 103 may be a printer connected to the wireless communications network 100 with a wired link to the second communication device 102. Another example of the device 103 being non-wireless is a light indicator on a boat with a wired link to e.g., the second communication device 102, which itself may be located in the boat.

Typically, each of the first communication device 101 and the second communication device 102, will be a network node such as the network node 110 described below, e.g., a radio network node or a core network node, and the device 103 will be a wireless device such as wireless device 120 described below. The radio network node, may be, e.g., a server in the cloud. This corresponds to the non-limiting particular example illustrated in FIG. 1. The first communication device 101 may be different than the second communication device 102, although they may be co-located as part of a same communication device. In some examples, the first communication device 101 may be the same as the second communication device 102.

The wireless communications network 100 comprises a plurality of network nodes, of which the first communication device 101 and the second communication device 102 may each be a network node 110, as depicted in FIG. 1. Each network node 110 may be an AP, such as a radio base station, for example an eNB, an eNodeB, or an Home Node B, an Home eNode B, a transmission point, a Base Station Controller (BSC), or any other network node capable to serve a wireless device, such as a STA, user equipment or a machine type communication device in the wireless communications network 100. Each network node 110 may support one or several communication technologies, and its name may depend on the technology and terminology used. In LTE, each network node 110, which may be referred to as an eNB, may be directly connected to one or more core networks, which are not depicted in FIG. 1 for the sake of simplicity. In fact, each network node 110, in some embodiments, may be a core network node, such as an Operational and Maintenance (O&M), an Operational Support Systems (OSS), a Mobility Management Entity (MME), etc. . . . . .

The wireless communications network 100 covers a, geographical, area 130, which in some embodiments may be divided into cell areas, wherein each cell area is served by a network node, although, one network node may serve one or several cells. This is not depicted in FIG. 1 for the sake of simplicity. As a radio network node, each network node 110 may be of different classes, such as, e.g., macro eNodeB, home eNodeB or pico base station, based on transmission power and thereby also cell size. In other examples wherein the wireless communications network 100 may be a non-cellular system, the network node 110 may serve receiving nodes or devices with serving beams. Any of the first communication device 101 and the second communication device 102 may also be implemented in a so-called distributed manner, wherein the actions described herein as being performed by any of the first communication device 101 and the second communication device 102 may actually be performed by one or more processors from different nodes communicating in the cloud, as depicted in FIG. 1.

The wireless communications network 100 comprises a plurality of wireless devices. A wireless device 120 also referred to herein as a STA, a user equipment or UE is located in the wireless communications network 100. The wireless device 120 may e.g. a wireless communication device such as a UE which is also known as e.g., mobile terminal, wireless terminal and/or mobile station, a mobile telephone, cellular telephone, or laptop with wireless capability, just to mention some further examples. The wireless device 120 may be, for example, portable, pocket-storable, hand-held, computer-comprised, boat-mounted mobile device, or a vehicle-mounted mobile device, enabled to communicate voice and/or data, via the RAN, with another entity, such as a server, a laptop, a PDA, or a tablet computer, sometimes referred to as a tablet with wireless capability, Machine-to-Machine (M2M) device, device equipped with a wireless interface, such as a printer or a file storage device, modem, or any other radio network unit capable of communicating over a wired or radio link in a communications system. FIG. 1 depicts three different non-limiting examples of the device 103. The first example is a smartphone, depicted in the top right corner of the Figure. In some examples, the wireless device 120 may be a light indicator with radio capability, and it may be mounted on a boat, as depicted in FIG. 1, or a water- or marine drone, as also depicted as an example in FIG. 1. The drone may have an ability to navigate in water, and in some embodiments, a capability to remove an external factor. The wireless device 120 is enabled to communicate wirelessly in the wireless communications network 100. The communication may be performed e.g., via a RAN and possibly one or more core networks, comprised within the wireless communications network 100.

In some embodiments, the device 103 may comprise an interface 140. The interface may be a screen or monitor.

One or more boats 151, 152 are located in the area 130. The one or more boats may comprise a first boat, which may be simply referred to herein as a boat 151, and a second boat, which may be simply referred to herein as another boat 152. Each of the one or more boats 151, 152 may have different characteristics, such as maker, model, size, weight, length, etc. . . . . Any of the one or more boats 151, 152 may be a motor boat, a vessel, a ship, a speed boat, etc. . . . . Each of the one or more boats 151, 152 has an engine 161, 162. The engine 161, 162 may itself have different characteristics such as power, maker, weight, model, etc. . . . . . A non-limiting example of the engine 161, 162 may be an electric propulsion engine. Two or more sensors 171, 172 are located in the boat. "In the boat" may be interpreted herein as to comprise, within the boat, on the boat, built-in the boat, attached to the boat, or anywhere else or in any other form in the boat. This may include any part of the boat, such as the engine 161, 162 itself. A first sensor 171 of the two or more sensors 171, 172 may be capable of detecting a speed of the boat in water. The first sensor 171 may be, for example, an ultrasonic speed sensor, a Global Positioning System (GPS) sensor, an accelerometer, etc. . . . . A second sensor 172 of the two or more sensors 171, 172 may be capable of detecting a power of the engine 161, as, e.g., revolutions per minute (rpm).

The first communication device 101 may communicate within the wireless communications network 100 with the second communication device 102 over a first link 181, which may be a wired link or a radio link. Each of the first communication device 101 and the second communication device 102 communicate within the wireless communications network 100 with any of the two or more sensors 171, 172 over a second link 182, which may also be a wired link or a radio link. Each second link 182 represented in FIG. 1 is depicted as a bidirectional think arrow. Each of the first communication device 101 and the second communication device 102 communicate within the wireless communications network 100 with the device 103 over a third link 183, which may also be a wired link or a radio link. Each third link 183 represented in FIG. 1 is depicted as a bidirectional thick arrow. Only some links are depicted in FIG. 1 for illustrative purposes. The representation is not exhaustive to simplify the Figure. Whether any of the first link 181, second link 182 and third link 183 is a wired link or a wireless link, as one of skill in the art will appreciate, may depend on the location and characteristics of each of the devices in communication. For example, if the second communication device 102 and the device 103 are both built-in the boat, the third link 183 may be a wired connection. In another example, if the second communication device 102 is a network node in the cloud, and the device 103 is a smartphone, the third link 183 may be a radio link. Any of the first link 181, the second link 182 and the third link 183 may comprise one or more links, that is, they may establish a direct connection or an indirect connection between the pertinent devices. Each of the first communication device 101, the second communication device 102 and the device 103 may communicate with other devices through the wireless communications network 100, for example a source of additional information, e.g., providers of weather reports and forecasts. These other devices or structures are not represented in FIG. 1, to simplify the Figure.

In general, the usage herein of "first", "second", and/or "third", "fourth" and "fifth" may be understood to be an arbitrary way to denote different entities, and may be understood to not confer a cumulative or chronological character to the nouns they modify.

Embodiments of a method performed by a first communication device 101 operating in a wireless communications network 100, will now be described with reference to the flowchart depicted depicted in FIG. 2.

The method may comprise some or all of the following actions. One or more embodiments may be combined, where applicable. All possible combinations are not described to simplify the description. In FIG. 2, optional actions are indicated with dashed lines.

Action 201

Figure 2:
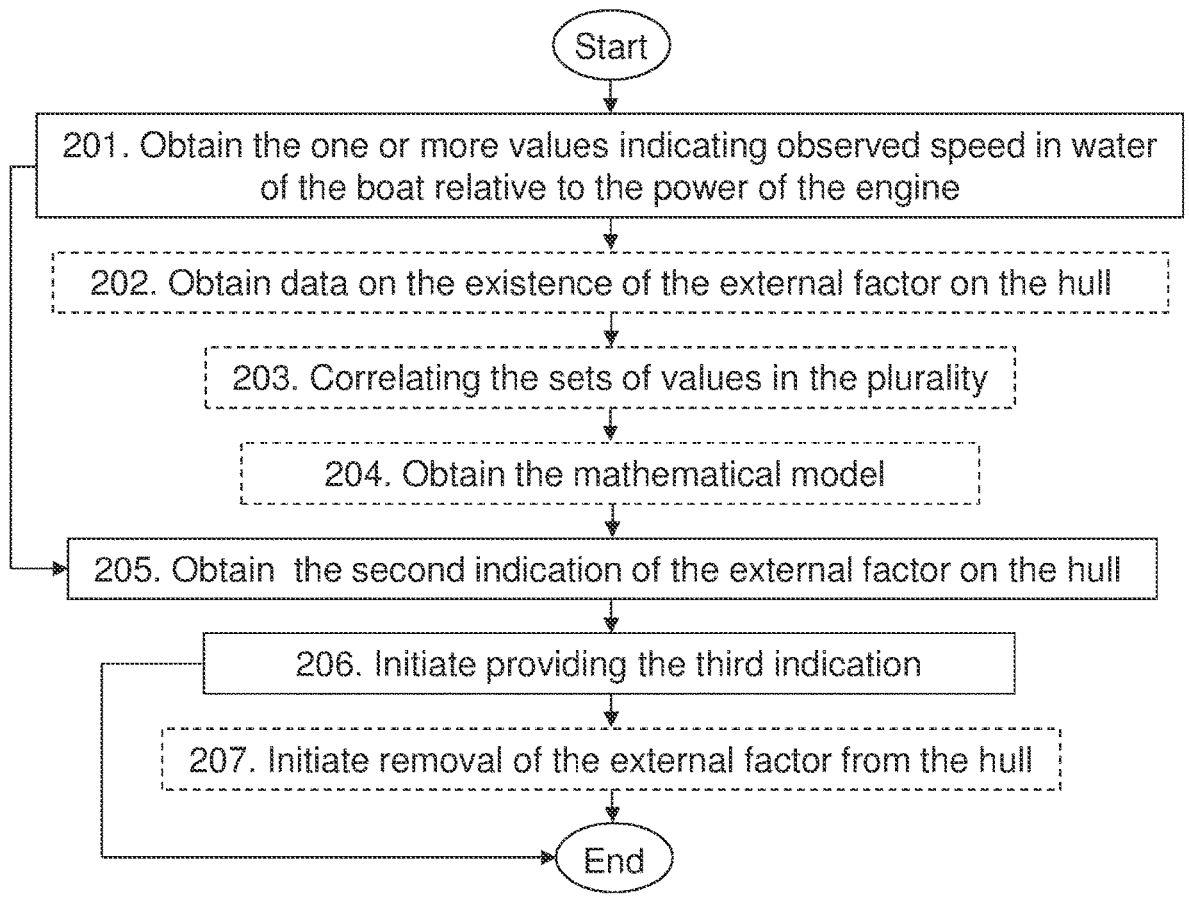
FIG. 2 is a flowchart depicting embodiments of a method in a first communication device, according to embodiments herein.

The first communication device 101 by performing the method described here in relation to FIG. 2, may be able to detect or forecast the existence of an external factor on the hull of the boat 151, the external factor causing friction against the water, which added to the friction of the boat itself, results in an increased friction, and therefore a slower speed in the water. The external factor, e.g., a presence of a mollusc or a crustacean adhered to the hull of a boat, e.g., of the boat 151, may be understood to be associated with an adherence of a certain strength to the hull. That is, with not becoming unattached from the hull of the boat 151 by the own friction of the hull against the water, even at high speed. In some embodiments, the external factor may be a presence of barnacles adhered to a hull, e.g., the hull of the boat 151. However, as mentioned before, the external factor may also be a presence of another organism attached to a hull, such as mussels, clams, or even seaweed. That the factor is external may be understood herein as that is not a part of the original boat, here the boat 151.

In order to detect or forecast the existence of the external factor on the hull of the boat 151 with the aim of, for example, initiating the removal of the external factor from the hull of the boat 151, in this Action, the first communication device 101 obtains, for the boat 151, and for each of a first number of time periods, a first set of one or more values indicating an observed speed of the boat 151 in water, relative to a first indication of a power of the engine 161 of the boat 151. The power is used to provide the speed. The first indication of the power of the engine 161 may be for example, a number indicating the revolutions per minute (rpm) of the engine 161. The observed speed is the registered or detected speed of the boat 151 in the water, as measured in e.g. knots, miles per hour, kilometers per hour, etc. . . . .

That the one or more values indicate the observed speed relative to the first indication may be understood to mean that the observed speed is associated to or corresponds to a certain power used to provide that speed. For example, the one or more values may be a single value, such as a ratio of the speed over the power used to provide the speed. The ratio may be calculates by the first communication device 101 in this Action 201, or received as a ratio from another device in the wireless communications network 100. In embodiments wherein the ratio may be calculated by the first communication device 101, the one or more values may be for example, two values, one for the speed of the boat 151, and one for the corresponding power of the engine 161 used to provide that speed. A first set may be understood here as a first group.

The time periods may be understood herein as time points. The first number of time points may be a single time point, or a plurality of time points. As will be explained later, in the simplest case, it may be possible to determine the existence of the external factor with a single time point. A time period may also be, e.g., a certain length of time. In such cases, the one or more values may be for example an average of e.g., the ratio of speed to power over the certain length of time.

The speed of the boat 151 and the first indication of the power of the engine 161 over the first number of time periods are obtained by the first communication device 101 from the two or more sensors 171, 172 in the boat 151, over the wireless communications network 100, e.g., via a respective second link 182 with each of the two or more sensors 171, 172. Obtaining may be understood herein as comprising receiving the information, or determining or calculating the information itself.

Action 202

In some embodiments, the first communication device 101 may build a mathematical model of the existence of the external factor on the hull of the boat 151, so that the first set of the one or more values indicating the observed speed of the boat 151 in water, relative to the first indication of the power of the engine 161 of the boat 151 may be used to detect or predict the existence of the external factor in the area 130, in other areas, for the boat 151 itself, or for another boat 152.

In some examples, the mathematical model may be used to describe an expected speed of the boat 151 in the water relative to the first indication of the power of the engine 161 of the boat 151, for a set of conditions. The set of conditions may be, for example, salinity of the water, wind, currents, water temperature, water pollution, etc. . . . . These may be understood as conditions that may affect the existence of the external factor, e.g., on the hull of the boat 151. In some cases, the mathematical model may be used to describe the expected speed of the boat 151 in water, for a certain speed, by default, in the absence of the external factor.

In more elaborate models, the mathematical model may be used to describe the existence of the external factor. Such cases may rest on the assumption that the temporal and spatial spreading of the external factor follows certain patterns, influenced by the set of conditions, e.g., weather conditions. For example, from north side to south side or from East to West side of the area 130, depending on water temperatures, salinity, currents, and wind direction.

The weather forecasts per area, some historical values of the weather, together with the current situation of the external factor, may later be used as input to the trained model to generate forecasted probabilities of infestation corresponding to the external factor per area. The current status of infestation per area and weather forecasting as input to the model may generate a prediction of the conditions that may trigger the arrival of the external factor in other areas.

According to the foregoing, in order to build a mathematical model of the existence of the external factor on the hull of the boat 151, in this Action, the first communication device 101 may obtain data on an existence of the external factor on the hull of the boat 151 during the first number of time periods, the external factor causing friction against the water. The first number of time periods may be a plurality of time periods. In other words, in this Action 202, the first communication device 202 may collect data to be able to establish whether a particular observed speed of the boat 151 in water relative to a first indication of the power of the engine 161 of the boat 151 corresponds to a existence of the external factor on the hull of the boat 151. The hull of the boat may be understood to refer to external face of the hull, facing the water. Data may be understood here as information, such as a result of a visual inspection of the hull of the boat 151 to determine if the external factor is detected or not. The data may also be obtained from another sensor on the hull of the boat 151, the another sensor being capable of measuring the existence of the external factor, attached to the boat 151. The data may be obtained within a certain time window in relationship to when a corresponding speed and power of the engine 161 may be collected.

The obtaining in this Action 202 may be understood as receiving from another device in the wireless communications network 100, or receiving an input from a user on an interface associated with the first communication device 101.

Action 203

The first communication device 101 may want to correlate the performance of the boats with other boats in the vicinity. When many ships with similar origin exhibit a similar decrease in performance, and impact from current-, wind-speed and waves may have been removed, then there may be a very likely correlation among these boats with existence of the external factor on the hull of the boat 151 causing a drag. A decrease in performance may be understood here as a decrease in the observed speed of the boat 151 for a certain power of the engine 161, with respect to a default, expected value.

To be able to assess the correlation among a plurality of boats, in some embodiments, the first communication device 101 may obtain the one or more values for more boats than just the boat 151. That is, in some embodiments, the obtaining 201 the first set of one or more values may further comprise obtaining a plurality of sets of the one or more of values. Each of the sets in the plurality may be for each of the one or more boats 151, 152 in the area 130, for a respective number of time periods for each one of the one or more boats 151, 152. Different boats may provide a different number of time periods, they do not have to each provide values for the same number of time periods. In such embodiments, the first communication device 101, in this Action, may correlate the sets of values in the plurality.

For the purpose of performing this Action 203, a unique identifier, harborID, may be assigned to each harbor. Since leisure boats spend most of the time in harbor, an identifier of the harbor, e.g., the harborID may be used to correlate ships in the area 130. Using the Global Positioning System (GPS) location transmitted by boats, it may be possible to assign an origin harbor to all boats.

The obtained plurality of sets of the one or more of values may be stored in a memory as a time series data.

Action 204

In this Action, the first communication device 101 may obtain 204 the mathematical model. The mathematical model may be of the existence of the external factor on the hull of the boat 151 causing friction against the water. The mathematical model may be understood as a predictive mathematical model, e.g., a regression, used for forecasting some time in advance when the external factor may be predicted to correspond to an infestation in a certain area, e.g., the area 130.

The mathematical model may be based on the obtained first set of one or more values for each of the plurality of time periods and the obtained data. That is, the mathematical model may be built by using at least the obtained first set of the one or more values for each of the plurality of time periods and the obtained data.

The mathematical model may be further based on, that is, built using, the set of conditions mentioned earlier. Hence, the mathematical model may be based on weather reports containing current and forecasted wind, current-direction, wave height, water temperature, which may be are collected by the first communication device 101. Other parameters that may be comprised in the set of conditions may be of a more constant nature, such as the salt percentage of the water, and what kind of boat, e.g., model, brand, may be reporting the information. For each boat or engine model, there may be a data sheet or table, with a correspondence of power of the engine, in e.g., rpm, at different speeds. The one or more boats 151, 152 in each area 130 may report to the first communication device 101. The one or more boats 151, 152 may report time, speed, wind, travel direction, rpm, fuel level and GPS-position on a regular basis when they are moving.

The mathematical model may be determined or calculated by the first communication device 101 itself, or retrieved from a memory, having the mathematical model been previously calculated. Alternatively, the mathematical model may be obtained by receiving it from another communication device, such as the second communication device 102, in the wireless communications network 100, via, e.g., the first link 181.

The obtaining of the mathematical model may be achieved by, for example, performing machine learning. A model per boat may be trained to detect the normal speed versus the power of the engine 161, in e.g., rpm, of the boat 151. This model may then be used to detect if e.g., the speed/rpm ratio for the boat 151 is trending down over the last few days or usages. If so, this may be a local problem for this specific boat 151, and it may be reported to the user of the boat, as described in Action 206.

This drop in speed/rpm ratio may also then be used by the first communication device 101 as an indication that the external factor corresponds to an infestation in the area 130.

By being able to detect or predict whether the external factor corresponds to an infestation the area 130, boat owners that may no use their boat frequently may be able to still be notified of the infestation, and act accordingly, to remove the external factor from the hull of the boat 151.

Action 205

In this Action 205, the first communication device 101 obtains a second indication of the external factor on the hull of the boat 151, the external factor causing friction against the water. The obtaining in this Action 205 of the second indication is based at least on: i) the obtained first set of one or more values, and ii) a reference of the external factor, the reference being based on one of: a) a threshold indicating an expected speed of the boat 151 in the water relative to the first indication of the power of the engine 161 of the boat 151 for the set of conditions, and b) the mathematical model, as, for example, obtained in Action 204.

In other words, the second indication is an indicator of whether the external factor exists on the hull of the boat 151, and in some examples, whether the external factor exists on the hull of the boat 151 in a significant amount. The second indication may be, for example, a probability of the existence of the external factor per area. That is, that the second indication is of the external factor on the hull of the boat 151 does not necessarily mean that the second indication comprises a specific reference to the hull of the boat 151. The second indication may apply to the area 130 where the boat 151 is located.

The second indication is a based on, that is, determined by using, the comparison between the observed first set of one or more values and an expected value or values. That is, the second indication may allow to conclude whether the observed performance of the boat in water is within normal bounds, or whether it is decreased in a statistically significant manner. The expected speed of the boat 151 in the water relative to the first indication of the power of the engine 161 of the boat 151, may be based for example, on the data sheet or table mentioned earlier, wherein, for each boat or engine model, it may show a correspondence of power of the engine, in e.g., rpm, to different speeds. The reference of the external factor may be understood an indicator, or a criterion, of where the bounds of normal performance may be.

In some embodiments, the second indication may be a prediction of an existence of the external factor on the hull of the boat 151 at a future time period.

The second indication may adopt many forms. For example, the second indication may be a value a, showing the statistical significance, or not, of the difference between the obtained first set of one or more values, and the reference. The reference may be, for example, a threshold value. That is, if the decrease in speed for a certain engine power is sufficiently bigger than a set threshold of decrease, then the second indication may be interpreted to mean that there is a significant existence of the external factor on the hull of the boat 151. For example, a threshold may be 3 standard deviation of speed for a certain engine power, or a value lower than the 10 percentile of boat speeds. The difference may be evaluated based on one observed value, e.g., an average ratio, and an expected value. For example, once a mathematical model may be have been established for the existence of the external factor on the hull of a boat, from either the boat 151 or another boat 152 or boats, and how the external factor may affect the performance of the boat, understood as speed for a certain power of the engine, obtaining a single value of the observed speed of the boat 151 in water relative to the first indication may suffice to determine if the external factor exists on the hull of the boat 151 or not.

In other examples, the difference between the obtained first set of one or more values, and the reference may also be evaluated by comparing a mathematical model of a series of observed values, e.g., in time, versus a mathematical model of an expected performance of the boat 151 in water, that is, an expected speed for a certain power, when no external factor exists on the hull of the boat 151. Again here, the second indication is e.g. a number indicating whether the difference between the two models is statistically significant or not.

In some embodiments, the obtaining of the second indication in this Action 205 may be further based on additional information. That is, the second indication may be determined taking into consideration the additional information. The additional information may comprise at least one of: a) information on environmental conditions over the first number of one or more time periods, e.g., current and forecasted wind, current-direction, wave height, water temperature, b) one or more characteristics of the boat 151, e.g., kind of boat, e.g., model, brand, and c) a load of the boat 151 at the first number of the one or more time periods, e.g., how much freight the boat may carry. The additional information may have been obtained from another device connected to the wireless communications network 100 via one or more links. The another device may be, e.g., a weather report provider or similar. The additional information may also be obtained from a user of the boat 151, input via through e.g., the interface 140 of the device 103. The additional information may also be obtained from via one or more other sensors in the boat 151.

In some embodiments wherein Action 203 may have been performed, the obtaining 205 of the second indication may be further based on a result of the correlation. A statistically significant correlation may be used as an indication that the external factor corresponds to an infestation in the area 130. Otherwise, if only a minor part of the boats is indicating reduced speed for a certain engine power in the same area 130, these boats may have some other problem and this may be used as a notification to the boat owner or service station to check or perform service on the boat 151.

Action 206

Once the first communication device 101 may have established whether there is a significant existence of the external factor on the hull of the boat 151, in this Action 206, the first communication device 101 initiates providing a third indication of the external factor on the hull of the boat 151 to the device 103 connected to the wireless communications network 100, based on the obtained second indication. For example, the third indication may indicate an infestation corresponding to the external factor based on the obtained first set of one or more values matching a predetermined downward trend over the first number of time periods.

By initiate providing, it is meant herein that the first communication device 101 may send itself the third indication to the device 103, via e.g., the third link 183, or that the first communication device 101 may send an instruction to another communication device operating in the wireless communications network 100 to send the third indication to the device 103.

Again, the third indication may adopt many forms, which may depend on the characteristics and capabilities of the device 103. For example, if the device 103 is a light indicator on the boat 151, the third indication may be a signal instructing the bulb to light up. In another example, if the device 103 is a smartphone, the third indication may be an instruction to provide, on an interface 140 of the device 103, a fourth indication based on the received third indication. For example, if the interface 140 is a screen of a smartphone, the fourth indication may be a banner on the screen of the smartphone, stating that the external factor exists on the hull of the boat 151. The third indication may then be an instruction to show the banner on the screen of the smartphone.

In another example, if the device 103 is a drone that may be used for the automated removal of the external factor from the hull of the boat 151, the third indication may itself be an instruction to initiate removal of the external factor from the hull of the boat 151.

That providing the fourth indication is based on the third indication may be understood as that providing or not the fourth indication may rely on the content of the third indication.

That the initiating of the providing of the third indication is based on the obtained second indication may be understood to mean that the initiation of the providing of the third indication may be based on the external factor on the hull of the boat 151 being above a threshold. That is, the third indication may only be provided in the event there is an existence of the external factor on the hull of the boat 151, but not otherwise.

Action 206 may comprise in some examples, initiating providing the third indication to more boats, or all boats, in an area, such as the area 130. For example, the third indication may be provided to boat owners that have subscribed to a reporting service for the existence of the external factor, to boat washing service stations, see http://batmiljo.se/hitta-karta/, to environmental agencies, etc. . . . . . The third indication in this case may indicate information about when and which areas that are or may be infested in a future time point.

Action 207

Once the first communication device 101 may have established whether there is a significant existence of the external factor on the hull of the boat 151, in this Action 207, the first communication device 101 may initiate removal of the external factor from the hull of the boat 151, based on the obtained second indication. In a particular example, each harbor may have a drone that supports all boats in the harbor. The first communication device 101 may then, in this Action 207, instruct the drone to remove the external factor, e.g., barnacles adhered to the hull of the boat 151, from the hull of the boat 151, with e.g., mechanical arms having specialized brushes that may rotate over the hull at high speed to remove the external factor. That the initiation of the removal of the external factor from the hull of the boat 151 may be based on the obtained second indication may be understood as that the removal of the external factor from the hull of the boat 151 may only be initiated if obtained second indication indicates that the external factor is present on the hull of the boat 151, but not otherwise.

According to the foregoing, the first communication device 101 may be understood as a device capable of detecting or forecasting the existence of the external factor on the hull of the boat 151. In particular scenarios, the modelling function described in Actions 204, or 203, may be performed by a different node, such as the second communication node 102, and then provided to the first communication device 101. The second communication device 102 may therefore be understood as a modelling node.

Embodiments of a method performed by the second communication device 102 operating in a wireless communications network 100, will now be described with reference to the flowchart depicted depicted in FIG. 3.

The method may comprise some or all of the following actions. One or more embodiments may be combined, where applicable. All possible combinations are not described to simplify the description. In FIG. 3, optional actions are indicated with dashed lines.

The detailed description of some of the following corresponds to the same references provided above, in relation to the actions described for the first communication device 101, and will thus not be repeated here. For example, the external factor may be the presence of barnacles adhered to a hull, e.g., of the boat 151 or the another boat 152.

Action 301

The second communication device 102 by performing the method described here in relation to FIG. 2 may be able to build the mathematical model of the existence of the external factor on the hull of the boat 151, the external factor causing friction against the water, described above in relation to Actions 202-204. In order to build the mathematical model, in this Action 301, the second communication device 102 obtains, for the boat 151, and for each of the plurality of time periods, the first set of one or more values indicating the observed speed of the boat 151 in water relative to the first indication of the power of the engine 161 of the boat 151. The power is used to provide the speed. The speed of the boat 151 and the first indication of the power of the engine 161 over each of the plurality of time periods are obtained by the second communication device 102 from the two or more sensors 171, 172 in the boat 151, over the wireless communications network 100, e.g., via a respective second link 182 with each of the two or more sensors 171, 172. Obtaining may be understood herein as comprising receiving the information, or determining or calculating the information itself.

Action 301 may be performed similarly to Action 201.

Action 302

In this Action, the second communication device 102 may obtain, during the plurality of time periods, the data on the existence of the external factor on the hull of the boat 151, the external factor causing friction against the water. In other words, in this Action 302, the second communication device 302 may collect data to be able to establish whether a particular observed speed of the boat 151 in water relative to a second indication of the power of the engine 161 of the boat 151 corresponds to an existence of the external factor on the boat 151. The obtaining in this Action 302 may be understood as receiving from another device in the wireless communications network 100, or receiving an input from a user on an interface associated with the second communication device 102.

Action 302 may be performed similarly to Action 202.

Action 303

To be able to assess the correlation among the plurality of boats, in some embodiments, the obtaining in Action 301 of the first set of the one or more values may further comprise obtaining the plurality of sets of the one or more of values. Each of the sets in the plurality may be for each of the one or more boats 151, 152 in an area 130, for a respective number of time periods for each one of the one or more boats 151, 152. In such embodiments, the second communication device 102, in this Action 303, may correlate the sets of values in the plurality. The obtaining of the mathematical model of Action 305 may then be further based on a result of the correlation. That is, the result of the correlation may be used in computing the mathematical model.

Action 303 may be performed similarly to Action 203.

Action 304

In this Action, the second communication device 102 determines the mathematical model of the existence of the external factor on the hull of the boat 151 causing friction against the water, as described above for the first communication device 101 in Action 205. The mathematical model is based on the obtained first set of one or more values for each of the plurality of time periods and the obtained data. Determining the mathematical model may be understood herein as calculating the mathematical model.

In some embodiments, the determining 304 of the mathematical model may be further based on the additional information, which was described earlier. The additional information may comprise at least one of: a) the information on environmental conditions over the first number of one or more time periods, b) the one or more characteristics of the boat 151 and c) the load of the boat 151 at the first number of the one or more time periods.

Action 304 may be performed similarly to Action 204.

Action 305

In this Action 305, the second communication device 102 may obtain the second indication of the external factor on the hull of one of: a) the boat 151, and b) the another boat 152. The external factor on the hull may cause friction against the water at another point. That is, a first group of time periods may be used to build the mathematical model, and the second indication may be obtained to either detect or predict the existence of the external factor on the hull at a second time period, e.g., a future time period. The obtaining 305 of the second indication may be based on the determined mathematical model and the second set of the one or more values obtained from the of one of: a) the boat 151, and b) the another boat 152 for each of the first number of time periods, similarly to how it was described earlier for Action 205.

Action 306

In this Action 306, the second communication device 102 facilitates providing the third indication of the external factor on the hull of one of: a) the boat 151, and b) the another boat 152, to one of: the device 103 connected to the wireless communications network 100, and the first communication device 101 operating in the wireless communications network 100. The third indication is based on the determined mathematical model. Facilitating providing may be understood here as performing one or more actions to enable providing the third indication, either by the second communication device 102 itself, or by another communication device, e.g., the first communication device 101. That the third indication is based on the determined mathematical model may be understood as that the third indication may itself be the mathematical model, so that e.g., the first communication device 101 may then detect or forecast the existence of the external factor using the mathematical model, or performing the detection or prediction itself, and then providing an indication of the result of that detection or prediction to another device, e.g., the second communication device 102 or the device 103.

The third indication may be based on the obtained second indication, as was explained in relation to Action 205. For example, the facilitation of the providing of the third indication may be based on the external factor on the hull of the one of: a) the boat 151, and b) the another boat 152, being above the threshold.

The third indication may for example, indicate the infestation corresponding to the external factor based on the obtained second set of one or more values matching a predetermined downward trend over the first number of time periods.

Action 306 may be performed similarly to Action 206.

Action 307

Once the second communication device 102 may have established whether there is a significant existence of the external factor on the hull of the boat 151, in this Action 307, the second communication device 102 may initiate removal of the external factor from the hull, e.g., of the boat 151, based on the obtained second indication.

Action 307 may be performed similarly to Action 207.

Embodiments of a method performed by the device 103 connected to the wireless communications network 100, will now be described with reference to the flowchart depicted depicted in FIG. 4.

The method may comprise some or all of the following actions. One or more embodiments may be combined, where applicable. All possible combinations are not described to simplify the description. In FIG. 4, optional actions are indicated with dashed lines.

The detailed description of some of the following corresponds to the same references provided above, in relation to the actions described for the first communication device 101, and will thus not be repeated here. For example, the external factor may be the presence of barnacles adhered to a hull, e.g., of the boat 151.

Action 401

To be able to signal an indication to a user, e.g., the owner of the boat 151, of the existence of the external factor on the hull of the boat 151, or the another boat 152, or e.g., the area 130, in this Action 401, the device 103 receives, from the first communication device 101 operating in the wireless communications network 100, the third indication of the external factor on the hull of a boat 151, the external factor causing friction against water. The third indication is based at least on: i) for each of the first number of time periods, the first set of one or more values indicating the observed speed of the boat 151 in water relative to the first indication of the power of the engine 161 of the boat 151; the power is used to provide the speed; the speed of the boat 151 and the first indication of the power of the engine 161 over the first number of time periods is obtained from the two or more sensors 171, 172 in the boat 151, over the wireless communications network 100, and ii) the reference of the external factor; the reference is based on one of: a) the threshold indicating the expected speed of the boat 151 in the water relative to the first indication of the power of the engine 161 of the boat 151 for the set of conditions, and b) the mathematical model described earlier. The receiving may be performed via, e.g., the third link 183. The receiving may be via a dedicated message, or a broadcasted message to e.g., all boats in the area 130.

Action 402

In this Action, the device 103 provides, on the interface 140 of the device 103, the fourth indication based on the received third indication. As described earlier, the fourth indication may be a light indication on a bulb, a banner in a smartphone, a printout from a printer, a power on signal to a drone in the water in charge of removal of the external factor, etc. . . . . Provision of the fourth indication may be based on the third indication, as the fourth indication may only be provided when the third indication is associated with the existence of the external factor, but not otherwise.

Action 403

Finally the device 103 may, in Action 403, initiate removal of the external factor from the hull, based on the received third indication. That is, if the device 103 receives the third indication, indicating that the external factor on the hull of the boat 151 corresponds to an infestation, the device 103 may automatically initiate removal of the external factor from the hull of the boat 151. This may be implemented by the device 103 itself, if it has removal capability, e.g., a drone capable of such task, or it may be implemented by sending an instruction to another device with such capability to initiate the removal. For example, the device 103 may be smartphone on land sending an order a drone in the water, capable of removing the external factor from the hull of the boat 151.

To exemplify some of the foregoing in other words, particular examples herein may relate to a method for methods to automatically detect and forecast infestation corresponding to the external factor, e.g., the presence of barnacles adhered to hulls of boats in order to enable quick and easy removal in order to reduce fuel consumption.

One advantage of embodiments herein is that the methods described enable an automatic indication of an infestation corresponding to the external factor, e.g., the presence of adhered barnacles to a hull.

An additional benefit of embodiments herein is enabling obtaining more detailed information about the location and time of infestation.

A further advantage of embodiments herein is that the methods described herein, enable to predict in advance when the external factor will correspond to an infestation.

All this in turn results in reduced fuel consumptions for boats, reduced environmental impact from protective paint, and reduced cost for boat owners to monitor, prevent and remove external factors from the hull of boats, causing, increased, friction of the hull with the water.

Figure 5:
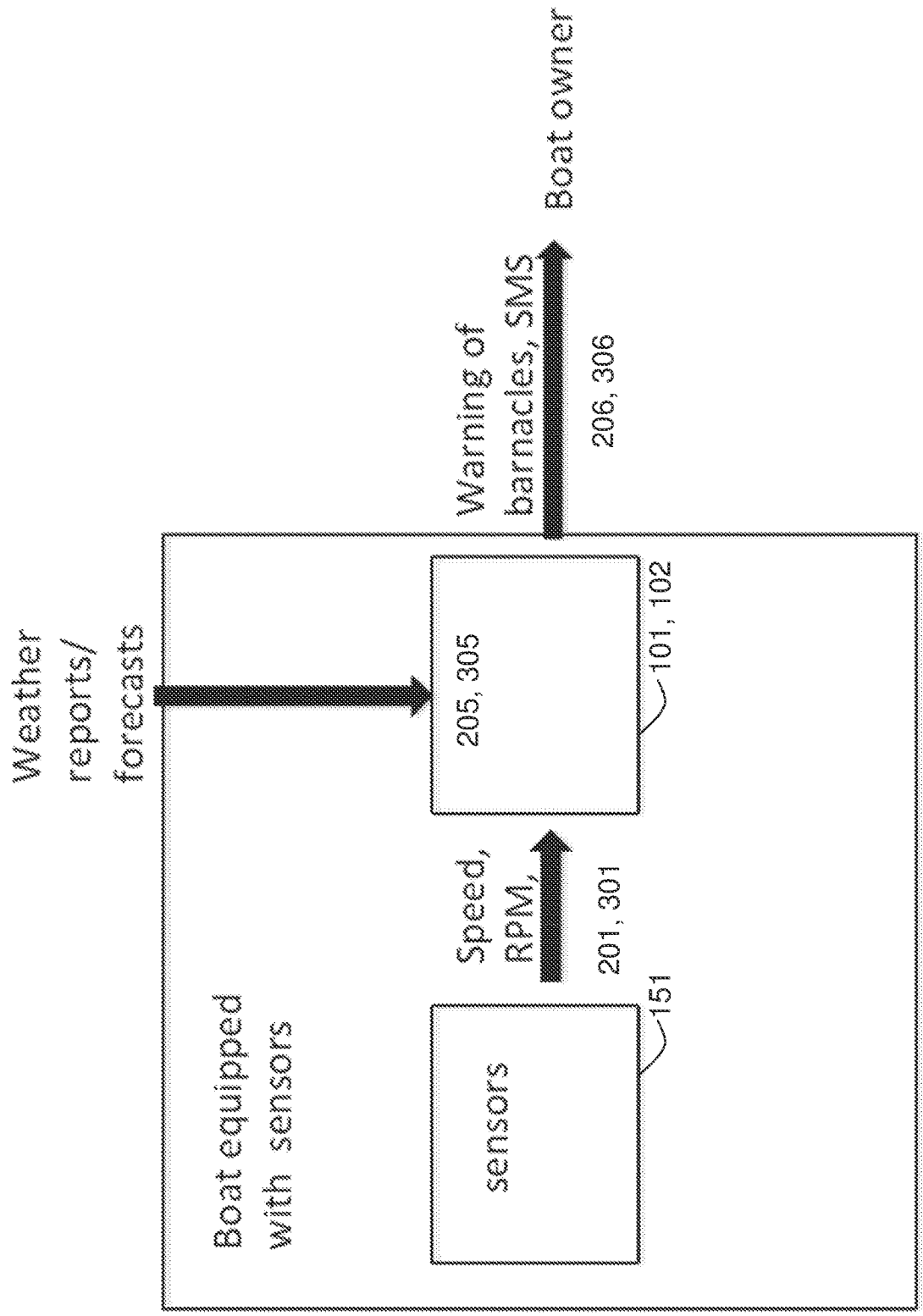
FIG. 5 is a flowchart depicting embodiments of a method in a first communication device or a second communication device, according to embodiments herein.

FIG. 5 is a schematic flowchart illustrating a particular example of embodiments herein, as performed by any of the first communication device 101 and the second communication device 102. The Figure will be described as performed by the first communication device 101, to simplify the description. As shown in the Figure, based on speed and engine power, in rpm, information obtained in Action 201 from the boat 151 equipped with the two or more sensors 171, 172, as well as based on the additional information, such as weather reports and forecasts, the first communication device 101, in Action 205, may obtain the second indication. Based on the second indication, the first communication device 101 then sends the third indication to the owner of the boat 151. The third indication is here a warning of the presence of barnacles on the hull of the boat 151, sent as an sms to the owner of the boat 151.

Figure 3:
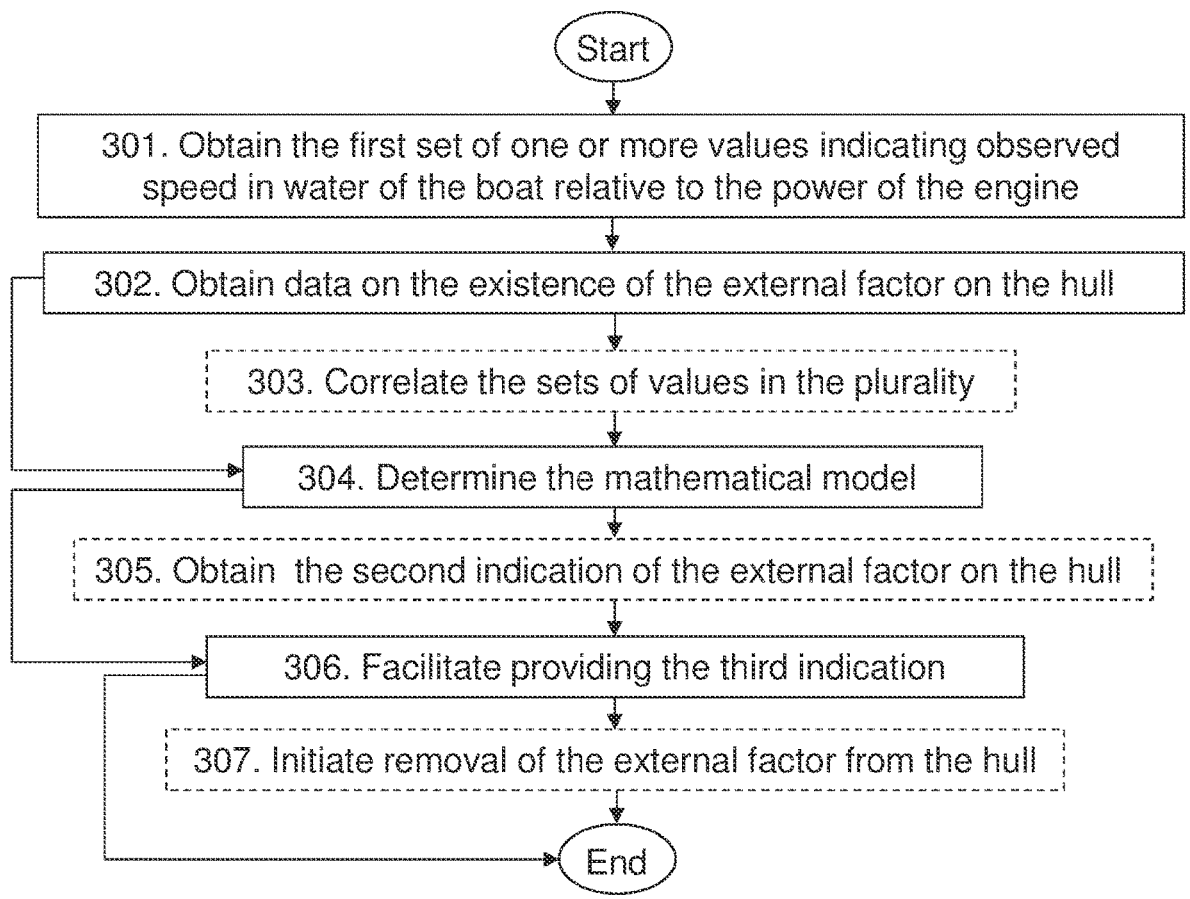
FIG. 3 is a flowchart depicting embodiments of a method in a second communication device, according to embodiments herein.
Figure 4:
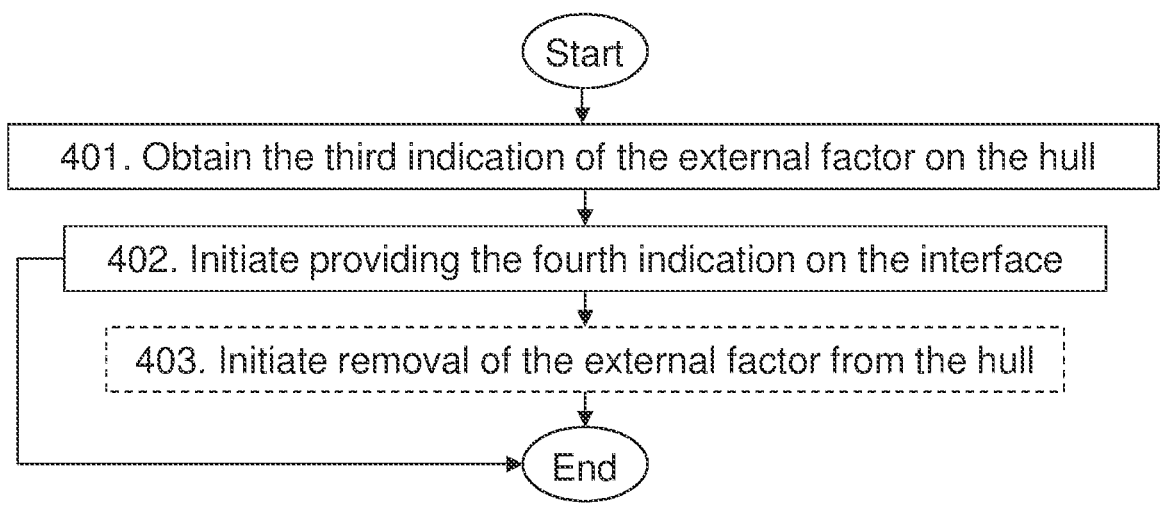
FIG. 4 is a flowchart depicting embodiments of a method in a device, according to embodiments herein.
Figure 6:
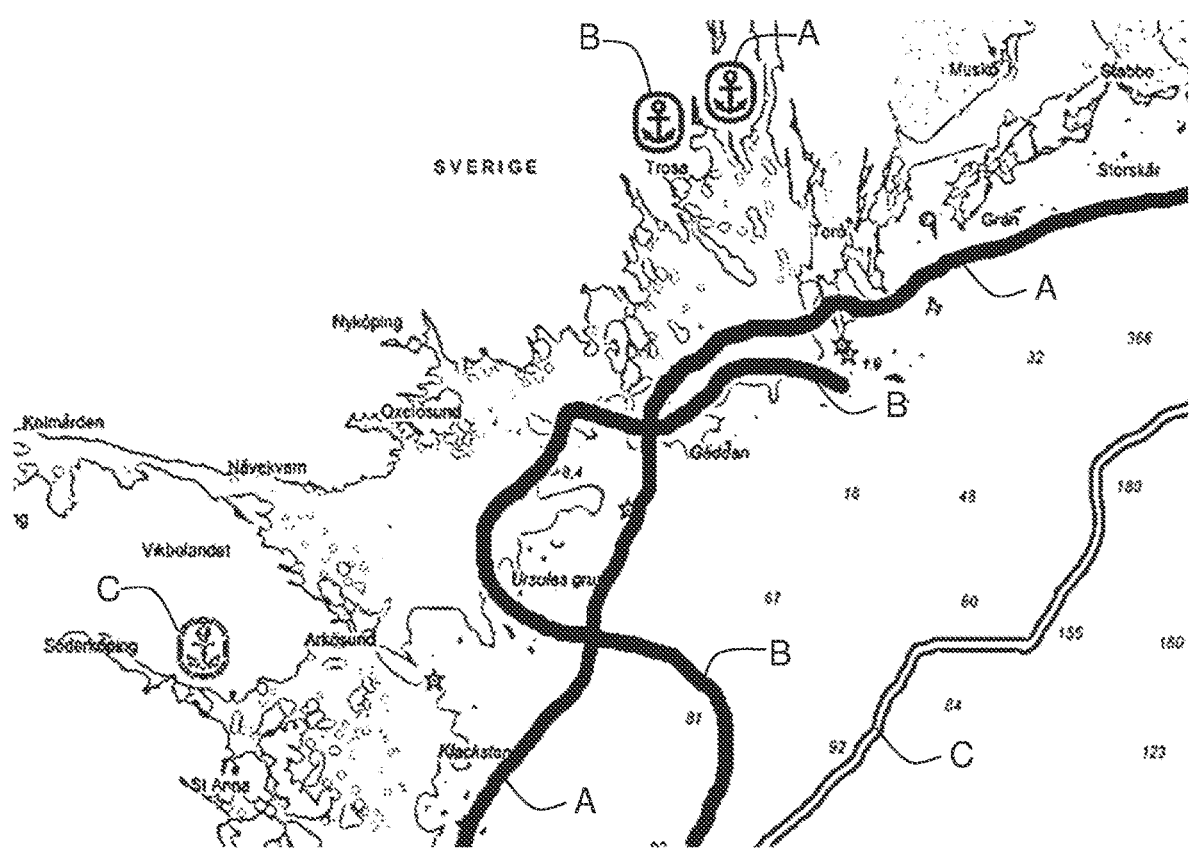
FIG. 6 is a schematic representation illustrating the movement of some boats and the home harbor.
Figure 6:
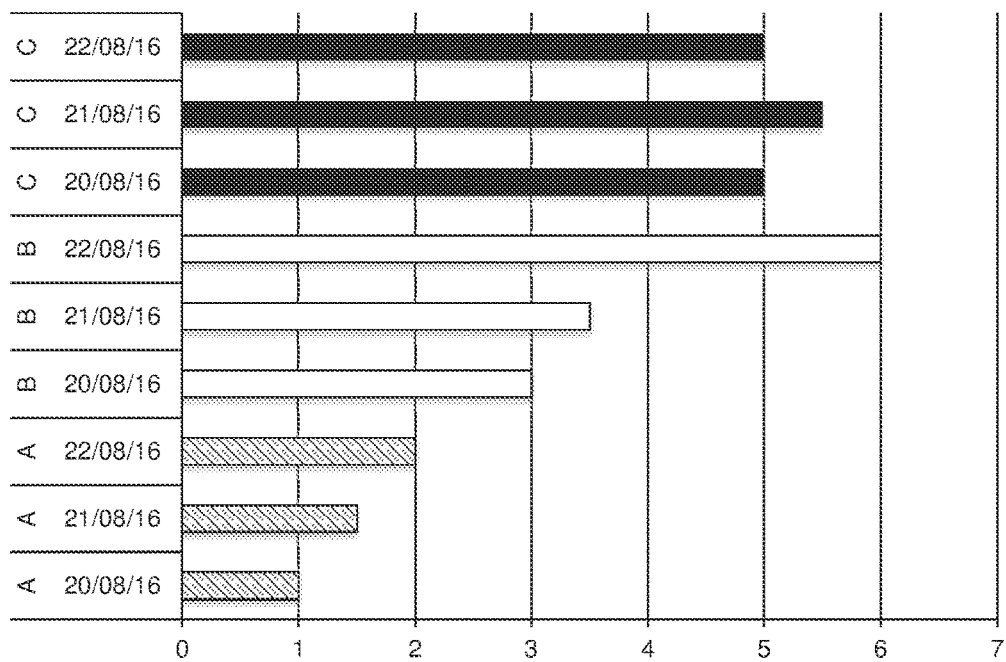

As may be understood from the foregoing, each of the Actions just described in relation to any of the FIGS. 2, 3 and 4, may be implemented for each of a plurality of boats comprising the boat 151, in a similar manner. Hence, according to the foregoing, in some particular examples, any of the first communication device 101 and the second communication device 102 may evaluate how boats are performing in specific geographic areas, e.g., examine information from 10 boats in a 10 square kilometre (km²) area, and if a statistically relevant number of them are reporting a drop in speed/rpm this may be because of barnacles. In order to evaluate this information, data such as that shown in FIG. 6 may be used. FIG. 6 shows the movement of three different boats A, B and C, in a map of a specific area, and their respective home harbour, indicated with an anchor for each of the boats. The graphic below shows, for each boat, and for each time point, here a particular date, the amount of hours each boat was navigating, and the map shows where, for a specific date. Any of the first communication device 101 and the second communication device 102 may receive information from boats, and weather forecasts from public or private sources, e.g., Sveriges Meteorologiska och Hydrologiska Institut (SMHI) in Sweden. Any of the first communication device 101 and the second communication device 102 may predict and forecast infestation of, e.g., barnacles, and report this to boat owners with boats in the infested areas, for example any of the home harbours for boats A, B or C. In a local implementation, each boat, e.g., the boat 151, may be equipped with any of the first communication device 101 and the second communication device 102, which may send reports to the boat owner. In an alternative drone implementation, drones moving around in a limited area may be equipped with sensors that detect the external factor, and report this information to any of the first communication device 101 and the second communication device 102.

Figure 7:
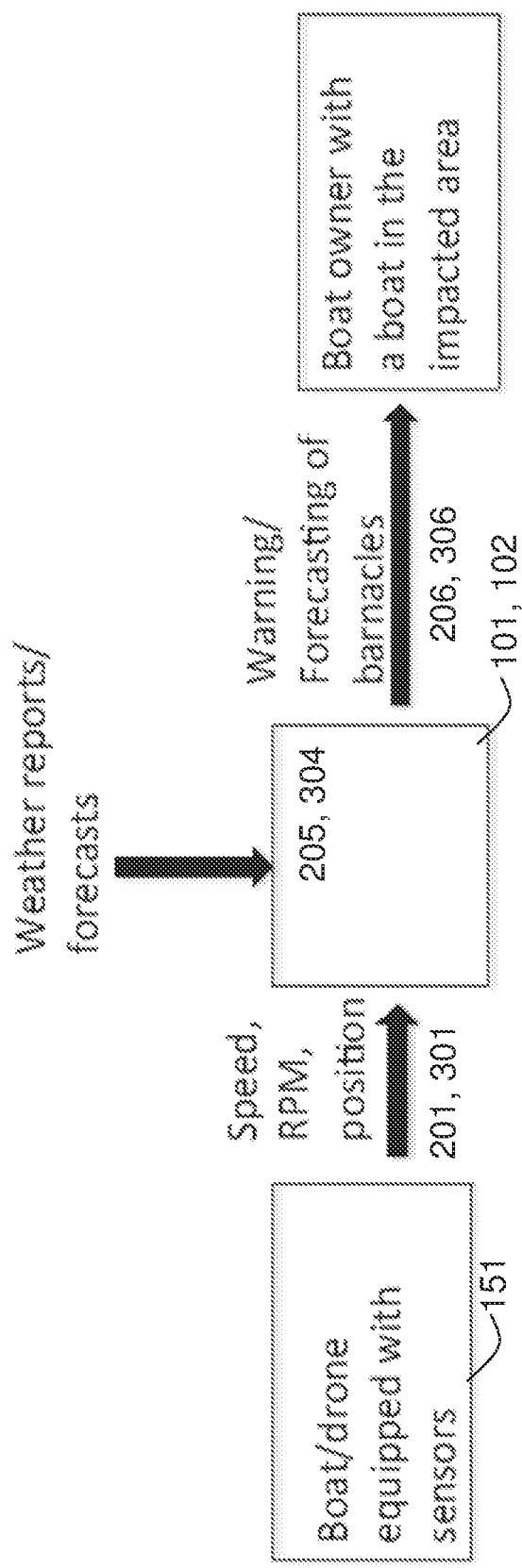
FIG. 7 is a flowchart depicting embodiments of a method in a second communication device, according to embodiments herein.

FIG. 7 is a schematic flowchart illustrating a particular example of embodiments herein, as performed by any of the first communication device 101 and the second communication device 102. The Figure will be described as performed by the first communication device 101, to simplify the description. As shown in the Figure, based on speed, engine power, in rpm, and position information obtained in Action 201 from the boat 151, or a drone, equipped with the two or more sensors 171, 172, as well as based on the additional information, such as weather reports and forecasts, the first communication device 101, in Action 205, may obtain the second indication. Based on the second indication, the first communication device 101 then sends, in Action 206, the third indication to any owner of a boat located in the area 130, such as the boat 151, based on the obtained position information. The third indication is here a warning or a forecasting of barnacles in the area 130.

FIG. 8 is a schematic flowchart illustrating a particular example of Actions of embodiments herein, as performed by any of the first communication device 101 and the second communication device 102. The Figure will be described as performed by the second communication device 102, to simplify the description. As shown in the Figure, during a training phase, e.g., using machine learning methods, the second communication device 102, in Actions 301 and 302, may obtain a time series based on a history of detected barnacles per area. The second communication device 102 may also obtain the additional information, as a time series of weather reports per area. Based on the obtained information, the second communication device 102, in Action 304 may obtain the mathematical model.

FIG. 9 is a schematic flowchart illustrating a particular example of Actions of embodiments herein, as performed by any of the first communication device 101 and the second communication device 102. The Figure will be described as performed by the first communication device 101, to simplify the description. As shown in the Figure, during a forecasting phase, once the mathematical model has been obtained in action 204, the first communication device 101, in Actions 201 and 202, may obtain a current status of detected barnacles per area. The first communication device 101 may also obtain the additional information, as weather forecast reports per area. Based on the obtained information, first communication device 101, in Action 205, may obtain the second indication, which here, is a prediction of barnacles in the area 130 at a future time point. The first communication device 101, in Action 206, may then send an sms to the telephone numbers registered of all boat owners in the area 130, comprising the owner of the boat 151, notifying them of the result of the prediction.

Figure 10:
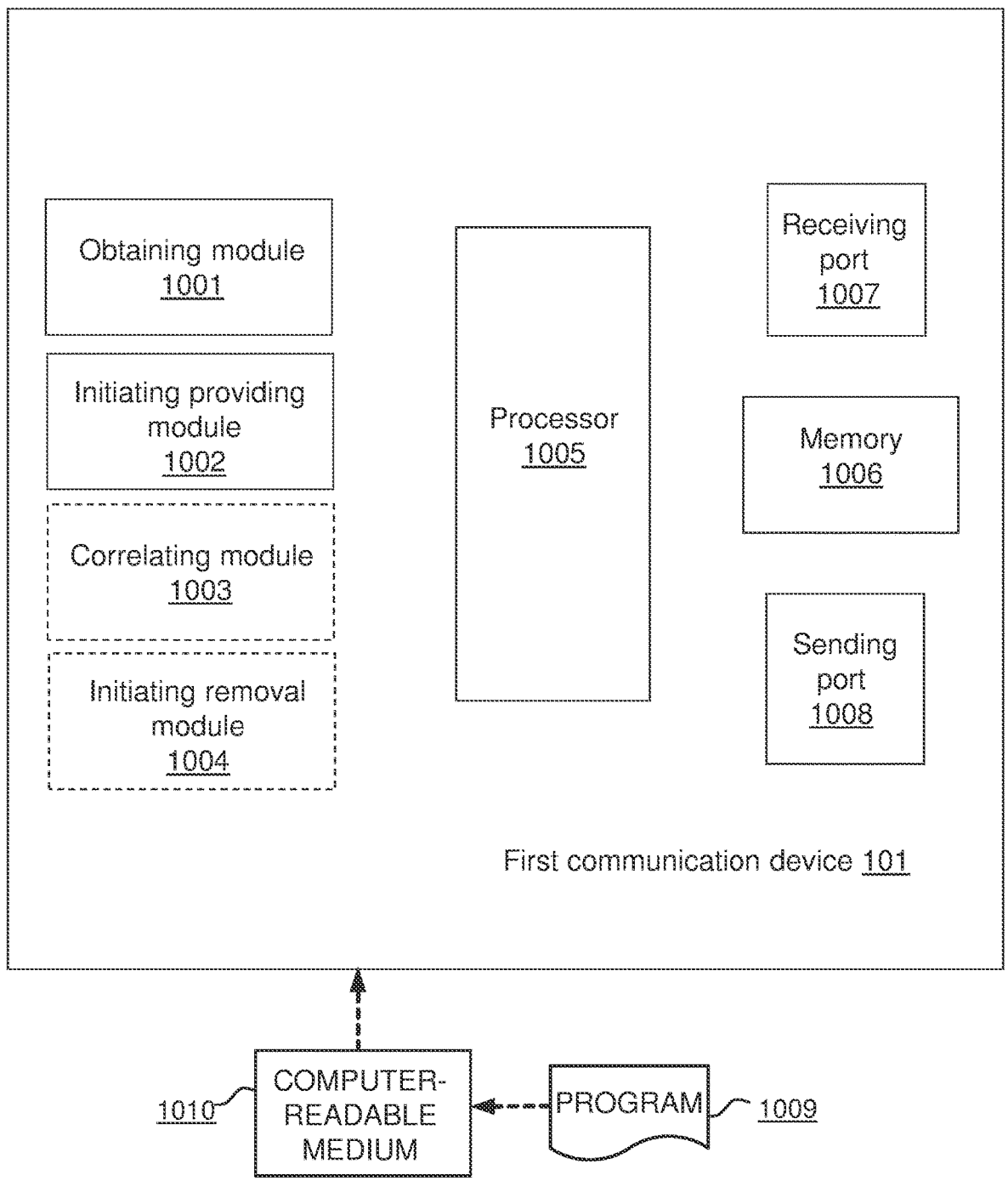
FIG. 10 is a schematic block diagram illustrating embodiments of a first communication device, according to embodiments herein.

To perform the method actions described above in relation to FIGS. 2, 5 and 7-9, the first communication device 101 may comprise the following arrangement depicted in FIG. 10. In FIG. 10, optional modules are indicated with dashed boxes. As stated earlier, the first communication device 101 is configured to operate in the wireless communications network 100.

The detailed description of some of the following corresponds to the same references provided above, in relation to the actions described for the first communication device 101, and will thus not be repeated here. For example, the external factor may be the presence of barnacles adhered to the hull.

The first communication device 101 is further configured to, e.g., by means of an obtaining module 1001 configured to, obtain, for the boat 151, and for each of the first number of time periods, the first set of one or more values configured to indicate the observed speed of the boat 151 in water relative to the first indication of the power of the engine 161 of the boat 151. The power is configured to be used to provide the speed. The speed of the boat 151 and the first indication of the power of the engine 161 over the first number of time periods are configured to be obtained by the first communication device 101 from the two or more sensors 171, 172 in the boat 151, over the wireless communications network 100.

The first communication device 101 is further configured to, e.g., by means of the obtaining module 1001 configured to, obtain the second indication of the external factor on the hull of the boat 151, the external factor causing friction against the water. To obtain the second indication is configured to be based at least on: i) the first set of one or more values configured to be obtained, and ii) the reference of the external factor, the reference being based on one of: a) the threshold configured to indicate the expected speed of the boat 151 in the water relative to the first indication of the power of the engine 161 of the boat 151 for the set of conditions, and b) the mathematical mode.

In some embodiments, wherein the first number of time periods is the plurality of time periods, and wherein the second indication is the prediction of an existence of the external factor on the hull of the boat 151 at the future time period, and the first communication device 101 may be further configured to, e.g., by means of the obtaining module 1001 configured to, obtain the data on the existence of the external factor on the hull of the boat 151, during the first number of time periods, the external factor causing friction against the water. The first communication device 101 may also be further configured to, e.g., by means of the obtaining module 1001 configured to, obtain the mathematical model, the mathematical model being configured to be of the existence of the external factor on the hull of the boat 151 causing friction against the water, and the mathematical model being configured to be based on the first set of one or more values configured to be obtained for each of the plurality of time periods and the data configured to be obtained.

In some embodiments, the mathematical model may be configured to be obtained by receiving it from the second communication device 102 in the wireless communications network 100.

In some embodiments, to obtain the second indication may be further configured to be based on the additional information. The additional information may comprise at least one of: a) the information on the environmental conditions over the first number of one or more time periods, b) the one or more characteristics of the boat 151 and c) the load of the boat 151 at the first number of the one or more time periods.

The first communication device 101 is further configured to, e.g., by means of an initiating providing module 1002 configured to, initiate providing the third indication of the external factor on the hull of the boat 151 to the device 103 configured to be connected to the wireless communications network 100, based on the second indication configured to be obtained.

In some embodiments, the initiation of the providing of the third indication may be configured to be based on the external factor on the hull of the boat 151 being above the threshold.

The third indication may be further configured to indicate the infestation corresponding to the external factor based on the first set of one or more values configured to be obtained, matching the predetermined downward trend over the first number of time periods.

In some embodiments, wherein to obtain the first set of one or more values further comprises to obtain the plurality of sets of the one or more of values, each of the sets in the plurality being for each of the one or more boats 151, 152 in the area 130, for the respective number of time periods for each one of the one or more boats 151, 152, the first communication device 101 may be further configured to, e.g., by means of a correlating module 1002 configured to, correlate the sets of values in the plurality, and to obtain the second indication may be further configured to be based on the result of the correlation.

The first communication device 101 may be further configured to, e.g., by means of an initiating removal module 1004 configured to, initiate removal of the external factor from the hull of the boat 151, based on the second indication configured to be obtained.

The embodiments herein may be implemented through one or more processors, such as a processor 1005 in the first communication device 101 depicted in FIG. 10, together with computer program code for performing the functions and actions of the embodiments herein. The program code mentioned above may also be provided as a computer program product, for instance in the form of a data carrier carrying computer program code for performing the embodiments herein when being loaded into the in the first communication device 101. One such carrier may be in the form of a CD ROM disc. It is however feasible with other data carriers such as a memory stick. The computer program code may furthermore be provided as pure program code on a server and downloaded to the first communication device 101.

The first communication device 101 may further comprise a memory 1006 comprising one or more memory units. The memory 1006 is arranged to be used to store obtained information, store data, configurations, and applications etc. to perform the methods herein when being executed in the first communication device 101.

In some embodiments, the first communication device 101 may receive information from the second communication device 102, the device 103 and/or other sources, such as a provider of weather reports or forecasts, through a receiving port 1007. In some embodiments, the receiving port 1007 may be, for example, connected to one or more antennas in first communication device 101. In other embodiments, the first communication device 101 may receive information from another structure in the wireless communications network 100 through the receiving port 1007. Since the receiving port 1007 may be in communication with the processor 1005, the receiving port 1007 may then send the received information to the processor 1005. The receiving port 1007 may also be configured to receive other information.

The processor 1005 in the first communication device 101 may be further configured to transmit or send information to e.g., the second communication device 102, and/or the device 103, through a sending port 1008, which may be in communication with the processor 1005, and the memory 1006.

Those skilled in the art will also appreciate that the obtaining module 1001, the initiating providing module 1002, the correlating module 1003, and the initiating removal module 1004 described above may refer to a combination of analog and digital modules, and/or one or more processors configured with software and/or firmware, e.g., stored in memory, that, when executed by the one or more processors such as the processor 1005, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1001-1002 described above may be implemented as one or more applications running on one or more processors such as the processor 1005.

Thus, the methods according to the embodiments described herein for the first communication device 101 may be respectively implemented by means of a computer program 1009 product, comprising instructions, i.e., software code portions, which, when executed on at least one processor 1005, cause the at least one processor 1005 to carry out the actions described herein, as performed by the first communication device 101. The computer program 1009 product may be stored on a computer-readable storage medium 1010. The computer-readable storage medium 1010, having stored thereon the computer program 1009, may comprise instructions which, when executed on at least one processor 1005, cause the at least one processor 1005 to carry out the action described herein, as performed by the first communication device 101. In some embodiments, the computer-readable storage medium 1010 may be a non-transitory computer-readable storage medium, such as a CD ROM disc, or a memory stick. In other embodiments, the computer program 1009 product may be stored on a carrier containing the computer program 1009 just described, wherein the carrier is one of an electronic signal, optical signal, radio signal, or the computer-readable storage medium 1010, as described above.

Figure 11:
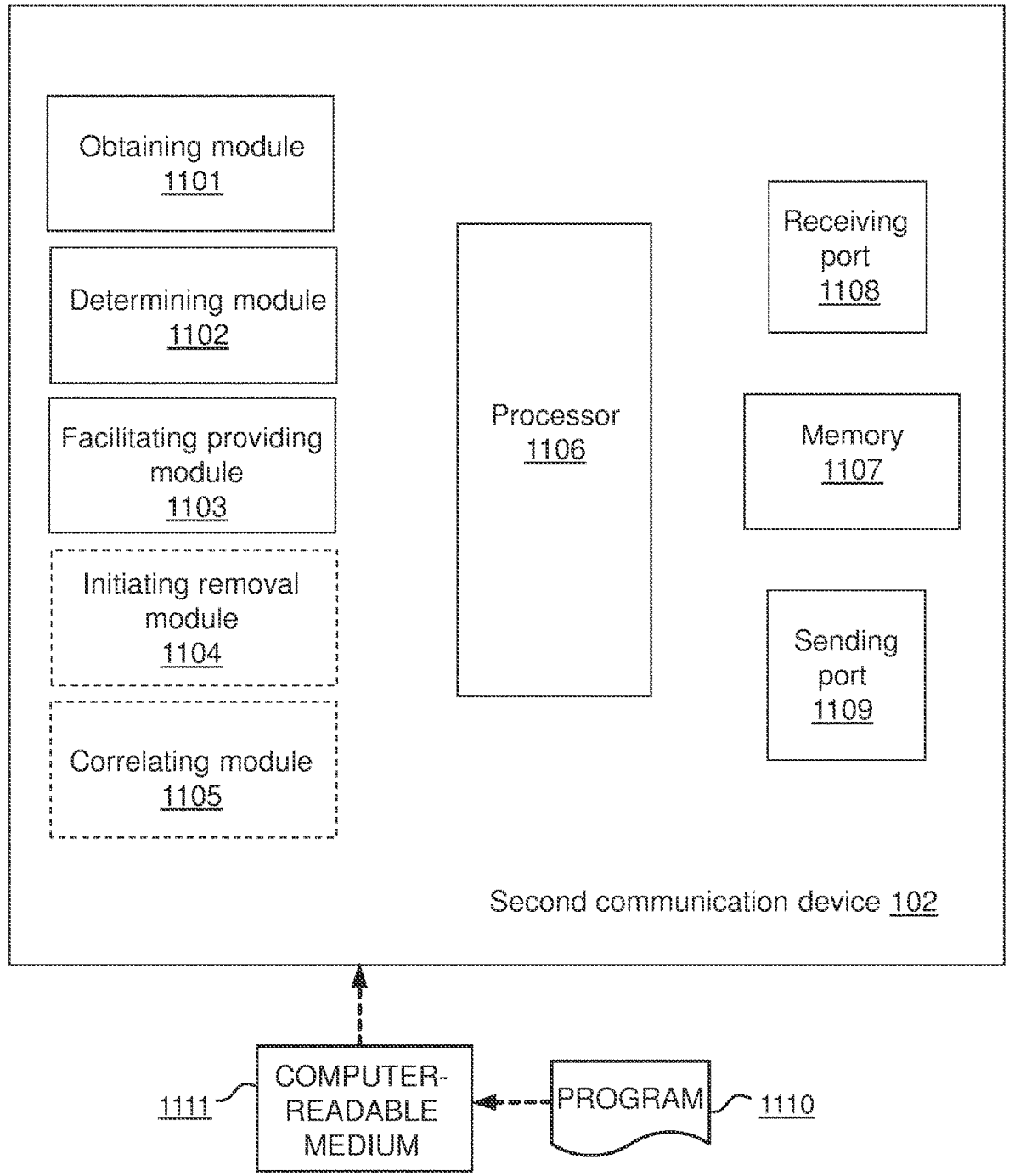
FIG. 11 is a schematic block diagram illustrating embodiments of a second communication device, according to embodiments herein.

To perform the method actions described above in relation to FIGS. 3, 5 and 7-9, the second communication device 102 may comprise the following arrangement depicted in FIG. 11. In FIG. 11, optional modules are indicated with dashed boxes. As stated earlier, the second communication device 102 is configured to operate in the wireless communications network 100.

The detailed description of some of the following corresponds to the same references provided above, in relation to the actions described for the second communication device 102, and will thus not be repeated here. For example, the external factor may be the presence of barnacles adhered to a hull.

The second communication device 102 is further configured to, e.g., by means of an obtaining module 1101 configured to, obtain, for the boat 151, and for each of the plurality of time periods, the first set of one or more values configured to indicate the observed speed of the boat 151 in water relative to the first indication of the power of the engine 161 of the boat 151. The power is configured to be used to provide the speed. The speed of the boat 151 and the first indication of the power of the engine 161 over each of the plurality of time periods are configured to be obtained by the second communication device 102 from two or more sensors 171, 172 in the boat 151, over the wireless communications network 100.

The second communication device 102 is further configured to, e.g., by means of the obtaining module 1101 configured to, obtain, during the plurality of time periods, data on the existence of the external factor on the hull of the boat 151, the external factor causing friction against the water.

The second communication device 102 may be further configured to, e.g., by means of the obtaining module 1101 configured to, obtain the second indication of the external factor on the hull of one of: a) the boat 151, and b) the another boat 152. The external factor on the hull may cause friction against the water at another point. To obtain the second indication may be configured to be based on the mathematical model configured to be determined and the second set of the one or more values configured to be obtained from the of one of: a) the boat 151, and b) the another boat 152 for each of the first number of time periods. The third indication may be configured to be based on the second indication configured to be obtained.

In some embodiments, the second communication device 102 is further configured to, e.g., by means of a determining module 1102 configured to, determine the mathematical model of the existence of the external factor on the hull of the boat 151 causing friction against the water, the mathematical model being configured to be based on the first set of one or more values configured to be obtained for each of the plurality of time periods and the data configured to be obtained.

The third indication may be configured to indicate the infestation corresponding to the external factor based on the second set of one or more values configured to be obtained, matching a predetermined downward trend over the first number of time periods.

In some embodiments, to determine the mathematical model may be further configured to be based on additional information, the additional information comprising at least one of: a) the information on the environmental conditions over the first number of one or more time periods, b) the one or more characteristics of the boat 151 and c) the load of the boat 151 at the first number of the one or more time periods.

The second communication device 102 is further configured to, e.g., by means of a facilitating providing module 1103 configured to, facilitate providing the third indication of the external factor on the hull of one of: a) the boat 151, and b) the another boat 152, to one of: the device 103 connected to the wireless communications network 100, and the first communication device 101 configured to operate in the wireless communications network 100, the third indication being configured to be based on the mathematical model configured to be determined.

In some embodiments, the facilitation of the providing of the third indication may be configured to be based on the external factor on the hull of the one of: a) the boat 151, and b) the another boat 152, being above the threshold.

The second communication device 102 may be further configured to, e.g., by means of an initiating removal module 1104 configured to, initiate removal of the external factor from the hull, based on the second indication configured to be obtained.

In some embodiments, wherein to obtain the first set of one or more values further comprises to obtain the plurality of sets of the one or more of values, each of the sets in the plurality being for each of the one or more boats 151, 152 in the area 130, for the respective number of time periods for each one of the one or more boats 151, 152, the second communication device 102 may be further configured to, e.g., by means of a correlating module 1105 configured to, correlate the sets of values in the plurality, and to obtain the second indication may be further configured to be based on the result of the correlation.

The embodiments herein may be implemented through one or more processors, such as a processor 1106 in the second communication device 102 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the second communication device 102. One such carrier may be in the form of a CD ROM disc. It is however feasible with other data carriers such as a memory stick. The computer program code may furthermore be provided as pure program code on a server and downloaded to the second communication device 102.

The second communication device 102 may further comprise a memory 1107 comprising one or more memory units. The memory 1107 is arranged to be used to store obtained information, store data, configurations, and applications etc. to perform the methods herein when being executed in the second communication device 102.

In some embodiments, the second communication device 102 may receive information from the first communication device 101, the device 103 and/or other sources, such as a provider of weather reports or forecasts, through a receiving port 1007. In some embodiments, the receiving port 1007 may be, for example, connected to one or more antennas in second communication device 102. In other embodiments, the second communication device 102 may receive information from another structure in the wireless communications network 100 through the receiving port 1007. Since the receiving port 1007 may be in communication with the processor 1106, the receiving port 1007 may then send the received information to the processor 1106. The receiving port 1007 may also be configured to receive other information.

The processor 1106 in the second communication device 102 may be further configured to transmit or send information to e.g., the first communication device 101, and/or the device 103, through a sending port 1109, which may be in communication with the processor 1106, and the memory 1107.

Those skilled in the art will also appreciate that the obtaining module 1101, the determining module 1102, the facilitating providing module 1103, the initiating removal module 1104, and the correlating module 1105 described above may refer to a combination of analog and digital modules, and/or one or more processors configured with software and/or firmware, e.g., stored in memory, that, when executed by the one or more processors such as the processor 1106, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1101-1105 described above may be implemented as one or more applications running on one or more processors such as the processor 1106.

Thus, the methods according to the embodiments described herein for the second communication device 102 may be respectively implemented by means of a computer program 1110 product, comprising instructions, i.e., software code portions, which, when executed on at least one processor 1106, cause the at least one processor 1106 to carry out the actions described herein, as performed by the second communication device 102. The computer program 1110 product may be stored on a computer-readable storage medium 1111. The computer-readable storage medium 1111, having stored thereon the computer program 1110, may comprise instructions which, when executed on at least one processor 1106, cause the at least one processor 1106 to carry out the action described herein, as performed by the second communication device 102. In some embodiments, the computer-readable storage medium 1111 may be a non-transitory computer-readable storage medium, such as a CD ROM disc, or a memory stick. In other embodiments, the computer program 1110 product may be stored on a carrier containing the computer program 1110 just described, wherein the carrier is one of an electronic signal, optical signal, radio signal, or the computer-readable storage medium 1111, as described above.

Figure 12:
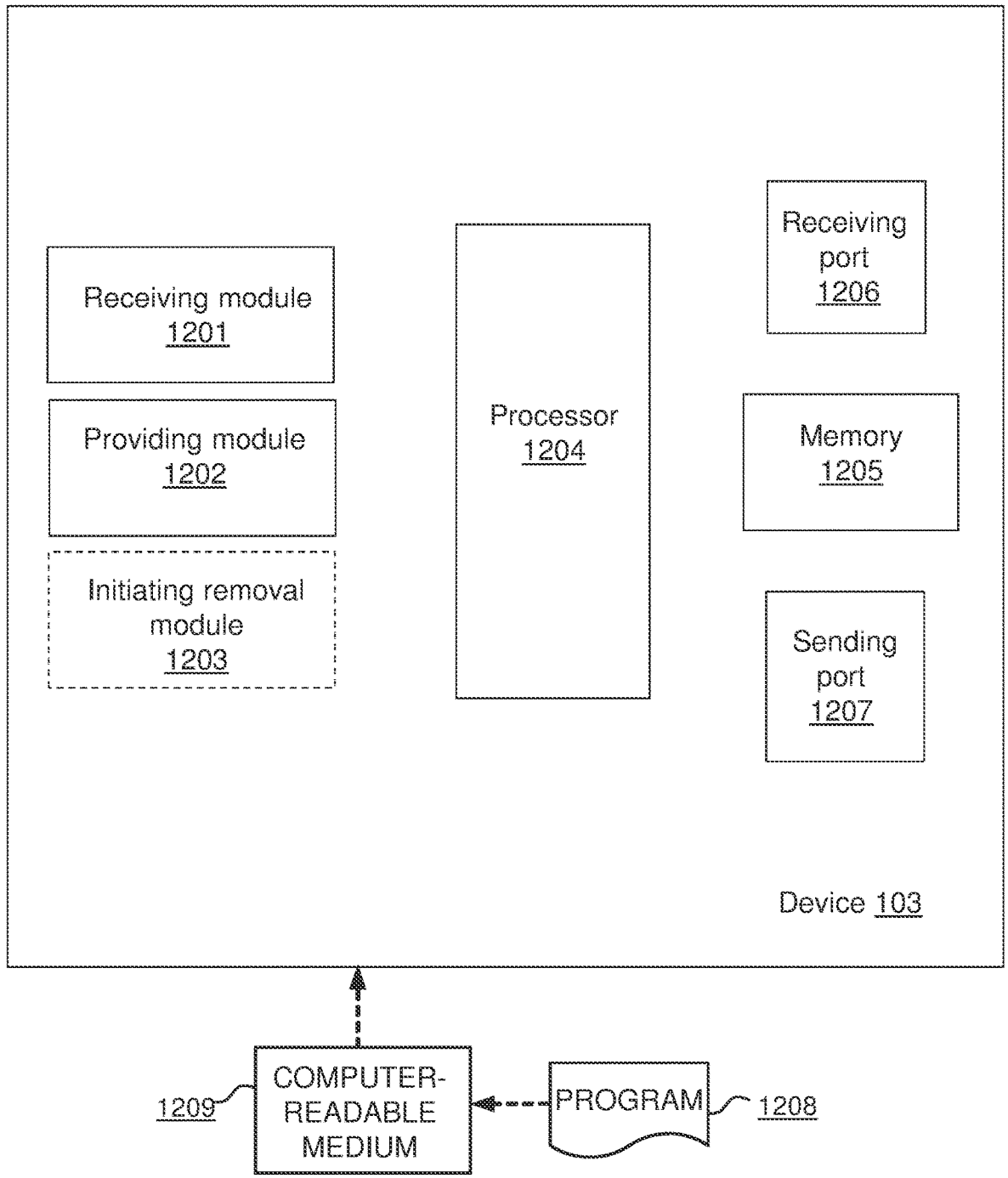
FIG. 12 is a schematic block diagram illustrating embodiments of a device, according to embodiments herein.

To perform the method actions described above in relation to FIG. 3, the device 103 may comprise the following arrangement depicted in FIG. 12. In FIG. 12, optional modules are indicated with dashed boxes. As stated earlier, the device 103 is configured to be connected to the wireless communications network 100.

The detailed description of some of the following corresponds to the same references provided above, in relation to the actions described for the device 103, and will thus not be repeated here. For example, the external factor may be the presence of barnacles adhered to a hull.

The device 103 is further configured to, e.g., by means of a receiving module 1201 configured to, receive, from the first communication device 101 configured to operate in the wireless communications network 100, the third indication of the external factor on the hull of the boat 151, the external factor causing friction against the water. The third indication is configured to be based at least on: i) for each of the first number of time periods, the first set of one or more values configured to indicate the observed speed of the boat 151 in the water relative to the first indication of the power of the engine 161 of the boat 151; the power is used to provide the speed; the speed of the boat 151 and the first indication of the power of the engine 161 over the first number of time periods are configured to be obtained from the two or more sensors 171, 172 in the boat 151, over the wireless communications network 100, and ii) the reference of the external factor; the reference is based on one of: a) the threshold configured to indicate the expected speed of the boat 151 in the water relative to the first indication of the power of the engine 161 of the boat 151 for the set of conditions, and b) the mathematical model.

The device 103 is further configured to, e.g., by means of a providing module 1202 configured to, provide, on the interface 140 of the device 103, the fourth indication based on the third indication configured to be received.

The device 103 may be further configured to, e.g., by means of an initiating removal module 1203 configured to, initiate removal 403 of the external factor from the hull, based on the third indication configured to be received.

The embodiments herein may be implemented through one or more processors, such as a processor 1204 in the device 103 depicted in FIG. 12, together with computer program code for performing the functions and actions of the embodiments herein. The program code mentioned above may also be provided as a computer program product, for instance in the form of a data carrier carrying computer program code for performing the embodiments herein when being loaded into the in the device 103. One such carrier may be in the form of a CD ROM disc. It is however feasible with other data carriers such as a memory stick. The computer program code may furthermore be provided as pure program code on a server and downloaded to the device 103.

The device 103 may further comprise a memory 1205 comprising one or more memory units. The memory 1205 is arranged to be used to store obtained information, store data, configurations, and applications etc. to perform the methods herein when being executed in the device 103.

In some embodiments, the device 103 may receive information from the second communication device 102, the device 103 and/or other sources, such as a provider of weather reports or forecasts, through a receiving port 1206. In some embodiments, the receiving port 1206 may be, for example, connected to one or more antennas in device 103. In other embodiments, the device 103 may receive information from another structure in the wireless communications network 100 through the receiving port 1206. Since the receiving port 1206 may be in communication with the processor 1204, the receiving port 1206 may then send the received information to the processor 1204. The receiving port 1206 may also be configured to receive other information.

The processor 1204 in the device 103 may be further configured to transmit or send information to e.g., the second communication device 102, and/or the device 103, through a sending port 1207, which may be in communication with the processor 1204, and the memory 1205.

Those skilled in the art will also appreciate that the receiving module 1201, the providing module 1202, and the initiating removal module 1003 described above may refer to a combination of analog and digital modules, and/or one or more processors configured with software and/or firmware, e.g., stored in memory, that, when executed by the one or more processors such as the processor 1204, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1201-1203 described above may be implemented as one or more applications running on one or more processors such as the processor 1204.

Thus, the methods according to the embodiments described herein for the device 103 may be respectively implemented by means of a computer program 1208 product, comprising instructions, i.e., software code portions, which, when executed on at least one processor 1204, cause the at least one processor 1204 to carry out the actions described herein, as performed by the device 103. The computer program 1208 product may be stored on a computer-readable storage medium 1209. The computer-readable storage medium 1209, having stored thereon the computer program 1208, may comprise instructions which, when executed on at least one processor 1204, cause the at least one processor 1204 to carry out the action described herein, as performed by the device 103. In some embodiments, the computer-readable storage medium 1209 may be a non-transitory computer-readable storage medium, such as a CD ROM disc, or a memory stick. In other embodiments, the computer program 1208 product may be stored on a carrier containing the computer program 1208 just described, wherein the carrier is one of an electronic signal, optical signal, radio signal, or the computer-readable storage medium 1209, as described above.

When using the word "comprise" or "comprising" it shall be interpreted as non-limiting, i.e. meaning "consist at least of".

"Based on", as used herein, may be understood in general as "using", "considering", "relying on", "depending on", or any other similar expressions.

The embodiments herein are not limited to the above described preferred embodiments. Various alternatives, modifications and equivalents may be used. Therefore, the above embodiments should not be taken as limiting the scope of the invention.

The invention claimed is:

1. A method performed by a first device, the method comprising:
   obtaining a first set of one or more values indicating an observed speed of a boat in water relative to a first indication of a power of an engine of the boat, the power being used to provide the speed, the speed of the boat and the first indication of the power of the engine over a first number of time periods being obtained from two or more sensors in the boat;
   obtaining a second indication of an external factor on the hull of the boat, the external factor causing friction against the water, the obtaining of the second indication being based at least on: i) the obtained first set of one or more values, and ii) a threshold indicating an expected speed of the boat in the water relative to the first indication of the power of the engine of the boat for a set of conditions; and
   initiating providing a third indication of the external factor on the hull of the boat to a second device based on the obtained second indication.

2. The method of claim 1, wherein the obtaining the first set of one or more values further comprises obtaining a plurality of sets of the one or more of values, each of the sets in the plurality being for each of the one or more boats in an area, for a respective number of time periods for each one of the one or more boats, and wherein the method further comprises:
   correlating the sets of values in the plurality, and wherein the obtaining of the second indication is further based on a result of the correlation.

3. The method of claim 1, wherein the first number of time periods is a plurality of time periods, wherein the second indication is a prediction of an existence of the external factor on the hull of the boat at a future time period, and wherein the method further comprises:
   obtaining data on an existence of the external factor on the hull of the boat during the first number of time periods, the external factor causing friction against the water, and
   obtaining the mathematical model, the mathematical model being of the existence of the external factor on the hull of the boat causing friction against the water, the mathematical model being based on the obtained first set of one or more values for each of the plurality of time periods and the obtained data.

4. The method of claim 1, wherein the obtaining of the second indication is further based on additional information, the additional information comprising at least one of: a) information on environmental conditions over the first number of one or more time periods, b) one or more characteristics of the boat and c) a load of the boat at the first number of the one or more time periods.

5. The method of claim 1, wherein the initiation of the providing of the third indication is based on the external factor on the hull of the boat being above a threshold.

6. The method of claim 1, further comprising:
initiating removal of the external factor from the hull of the boat, based on the obtained second indication.

7. The method of claim 1, wherein the external factor is a presence of barnacles adhered to the hull.

8. The method of claim 1, wherein the third indication indicates an infestation corresponding to the external factor based on the obtained first set of one or more values matching a predetermined downward trend over the first number of time periods.

9. A computer program product comprising a non-transitory computer readable medium storing a computer program comprising instructions which, when executed on at least one processor, cause the at least one processor to carry out the method of claim 1.

10. A method performed by a device connected to a wireless communications network, the method comprising:
receiving, from a first communication device operating in the wireless communications network, a first indication of an external factor on the hull of a boat, the external factor causing friction against water, the first indication being based at least on: i) a first set of one or more values indicating an observed speed of the boat in water relative to a first indication of a power of an engine of the boat, the power being used to provide the speed and ii) a threshold indicating an expected speed of the boat in the water relative to the first indication of the power of the engine of the boat for a set of conditions; and
providing, on an interface of the device, a second indication based on the received first indication.

11. The method of claim 10, further comprising:
initiating removal of the external factor from the hull, based on the received first indication.

12. A computer program product comprising a non-transitory computer readable medium storing a computer program, comprising instructions which, when executed on at least one processor, cause the at least one processor to carry out the method of claim 10.

13. A first communication device configured to operate in a wireless communications network, the first communication device being further configured to perform a method comprising:
obtaining a first set of one or more values indicating an observed speed of a boat in water relative to a first indication of a power of an engine of the boat, the power being used to provide the speed, the speed of the boat and the first indication of the power of the engine over a first number of time periods being obtained from two or more sensors in the boat;
obtaining a second indication of an external factor on the hull of the boat, the external factor causing friction against the water, the obtaining of the second indication being based at least on: i) the obtained first set of one or more values, and ii) a threshold indicating an expected speed of the boat in the water relative to the first indication of the power of the engine of the boat for a set of conditions; and
initiating providing a third indication of the external factor on the hull of the boat to a second device based on the obtained second indication.

14. The first communication device of claim 13, wherein to obtain the first set of one or more values further comprises to obtain a plurality of sets of the one or more of values, each of the sets in the plurality being for each of the one or more boats in an area, for a respective number of time periods for each one of the one or more boats, and wherein the first communication device is further configured to:
correlate the sets of values in the plurality, and wherein to obtain the second indication is further configured to be based on a result of the correlation.

15. The first communication device of claim 13, wherein the second indication is a prediction of an existence of the external factor on the hull of the boat at a future time period, and wherein the first communication device is further configured to:
obtain data on an existence of the external factor on the hull of the boat, during the first number of time periods, the external factor causing friction against the water, and
obtain the mathematical model.

16. The first communication device of claim 13, wherein the mathematical model is configured to be obtained by receiving it from a second communication device in the wireless communications network.

17. The first communication device of claim 13, wherein to obtain the second indication is further configured to be based on additional information, the additional information comprising at least one of: a) information on environmental conditions over a first number of one or more time periods, b) one or more characteristics of the boat or c) a load of the boat at the first number of the one or more time periods.

18. A device configured to be connected to a wireless communications network, the device being further configured to:
receive, from a first communication device configured to operate in the wireless communications network, a first indication of an external factor on the hull of a boat, the external factor causing friction against water, the first indication being configured to be based at least on: i) a first set of one or more values configured to indicate an observed speed of the boat in water relative to a first indication of a power of an engine of the boat, the power being used to provide the speed and ii) a threshold configured to indicate an expected speed of the boat in the water relative to the first indication of the power of the engine of the boat for a set of conditions; and
provide, on an interface of the device, a second indication based on the first indication.

19. The device of claim 18, being further configured to:
initiate removal of the external factor from the hull, based on the third indication.

20. An apparatus for providing a notification indicating that an external frictional factor has been detected, the apparatus comprising:
memory; and
processing circuitry coupled to the memory, wherein the apparatus is configured to perform a method comprising:
obtaining a first speed value, wherein the first speed value either i) indicates an observed speed of a boat or ii) was obtained using a value indicating an observed speed of the boat and a value indicating a power of an engine of the boat;
obtaining a first reference value; and
determining, based on the set of one or more speed values and the set of one or more reference values, whether or not to initiate providing the notification indicating that an external frictional factor has been detected, wherein determining whether or not to initiate providing the notification comprises determining a difference between the first speed value and the first reference value and determining whether the difference between the first speed value and the first reference value satisfies a condition.

21. The apparatus of claim 20, wherein
the first speed value indicates the observed speed of the boat, and
the first reference value is based on at least a power value indicating a power of the engine of the boat.

22. The apparatus of claim 21, wherein
the method further comprises providing the notification in response to determining that the difference between the first speed value and the first reference value satisfies the condition.

23. The apparatus of claim 20, wherein
the first speed value was obtained using a value indicating an observed speed of the boat and a value indicating a power of the engine of the boat, and
the first reference value is based on a weather report.

* * * * *